(12) United States Patent
Cobb

(10) Patent No.: US 9,702,273 B2
(45) Date of Patent: Jul. 11, 2017

(54) SYNCHRONOUSLY TIMED COUNTERROTATING CAM AND FOLLOWER APPARATUS

(71) Applicant: Matthew Cobb, Dallas, TX (US)

(72) Inventor: Matthew Cobb, Dallas, TX (US)

( * ) Notice: Subject to any disclaimer, the term of this patent is extended or adjusted under 35 U.S.C. 154(b) by 167 days.

(21) Appl. No.: 14/486,074

(22) Filed: Sep. 15, 2014

(65) Prior Publication Data

US 2016/0076406 A1    Mar. 17, 2016

Related U.S. Application Data

(63) Continuation of application No. PCT/US2013/032447, filed on Mar. 15, 2013.

(51) Int. Cl.
| | |
|---|---|
| *F01L 1/04* | (2006.01) |
| *F16H 21/28* | (2006.01) |
| *F02B 75/32* | (2006.01) |
| *F01B 9/06* | (2006.01) |

(52) U.S. Cl.
CPC ............... *F01L 1/04* (2013.01); *F16H 21/28* (2013.01); *F01B 2009/061* (2013.01); *F02B 75/32* (2013.01)

(58) Field of Classification Search
CPC .. F01L 1/04; F16H 53/04; F16H 21/28; F02B 75/32; F01B 2009/061
USPC ........................................................ 123/90.6
See application file for complete search history.

(56) References Cited

U.S. PATENT DOCUMENTS

| | | | |
|---|---|---|---|
| 2009/0314232 A1* | 12/2009 | Howell-Smith | ...... F01B 1/0624 123/55.2 |
| 2011/0180050 A1* | 7/2011 | Terry | ........................ F01B 9/06 123/572 |

* cited by examiner

*Primary Examiner* — Zelalem Eshete

(57) ABSTRACT

Counterrotating cam and follower apparatuses (C-CAFA) capable of converting reciprocating to rotational motion, and visa versa, utilizing counterrotating cams cooperating with at least one reciprocating cam follower. Apparatus cam counterrotation is ensured to be synchronously timed without necessity of prior art stationary geartrains, by and through apparatus cam follower(s) combining with counterrotating cam surfaces acting as moving follower constraints, provided that disclosed structural limitations, including those regarding cam and follower surface interface engineering slop, multiple degree of freedom cams, rotating and reciprocating follower(s), and electromechanical limitations are met when specified. Optional apparatus usages include reciprocating mass balancer, differential to reverse and or multiply shaft rotations, and apparatus combinations with connecting rods, pistons, cylinders, and or engines. "Adequacy of Constraint and Newtonian Force Analysis, Cam and Follower Surface Kinematical Analysis, and Electromagnetic Cam Analysis" are applied to various disclosed embodiments to teach making, using, and correlation of disclosed apparatus structure to function.

24 Claims, 18 Drawing Sheets

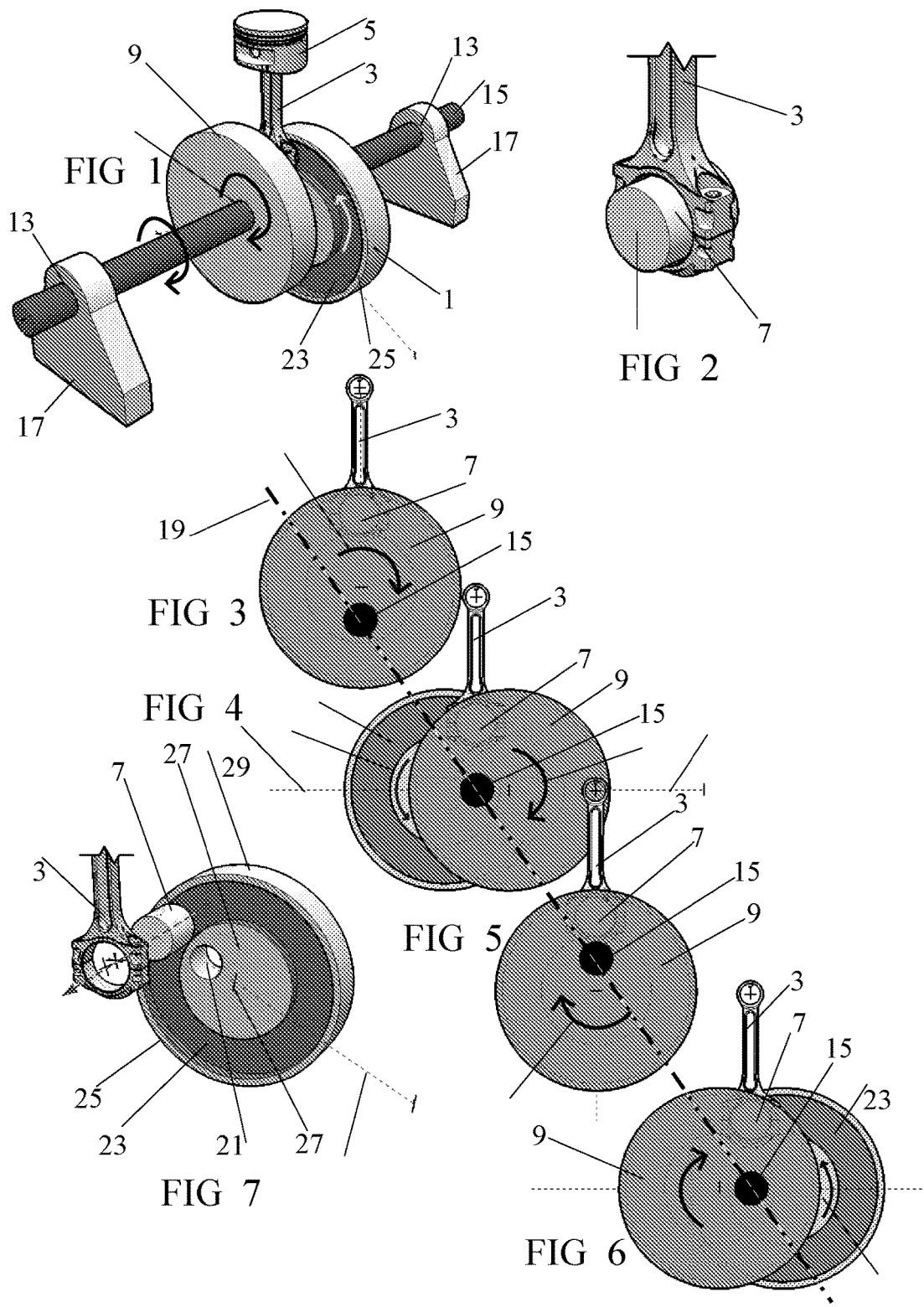

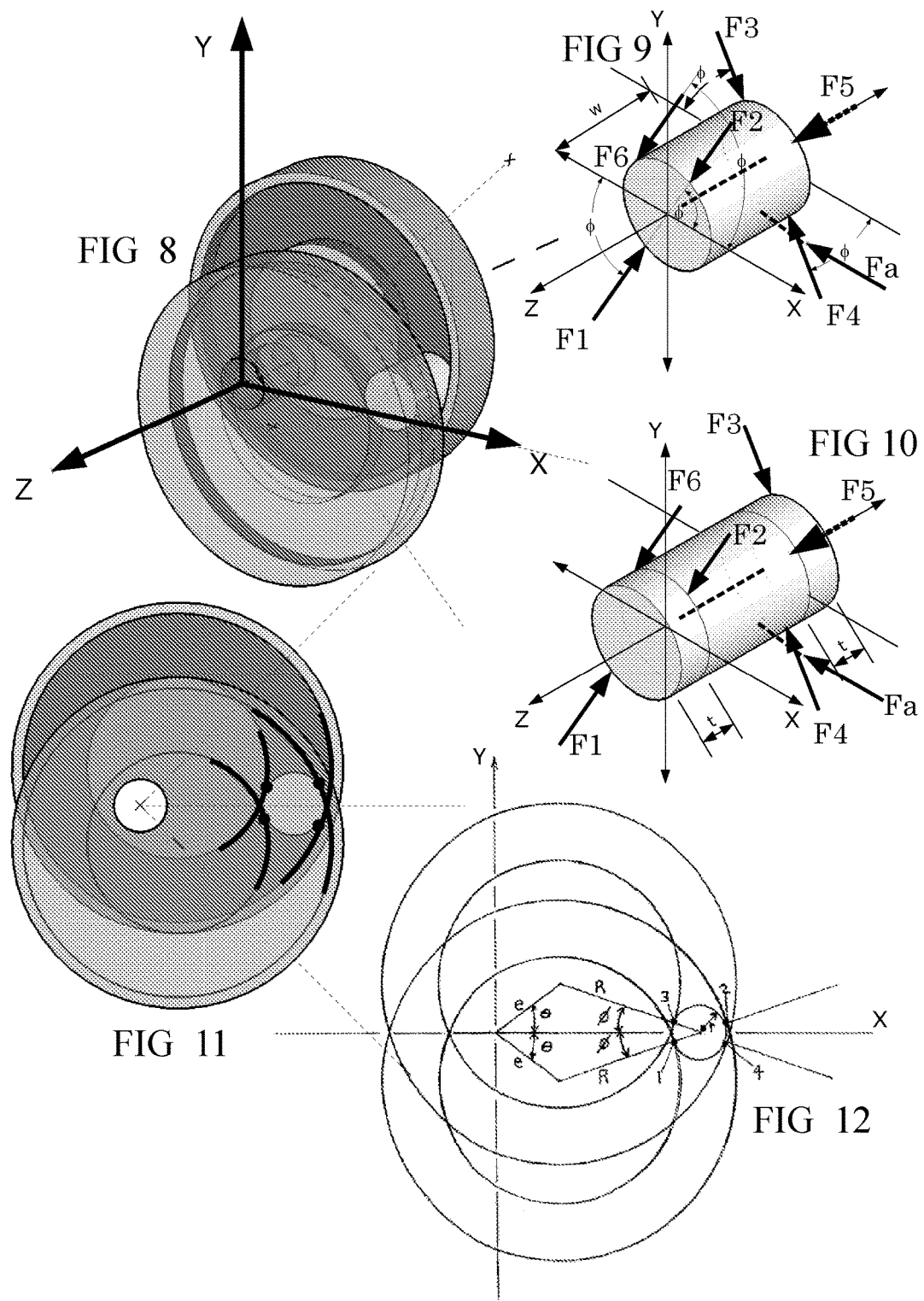

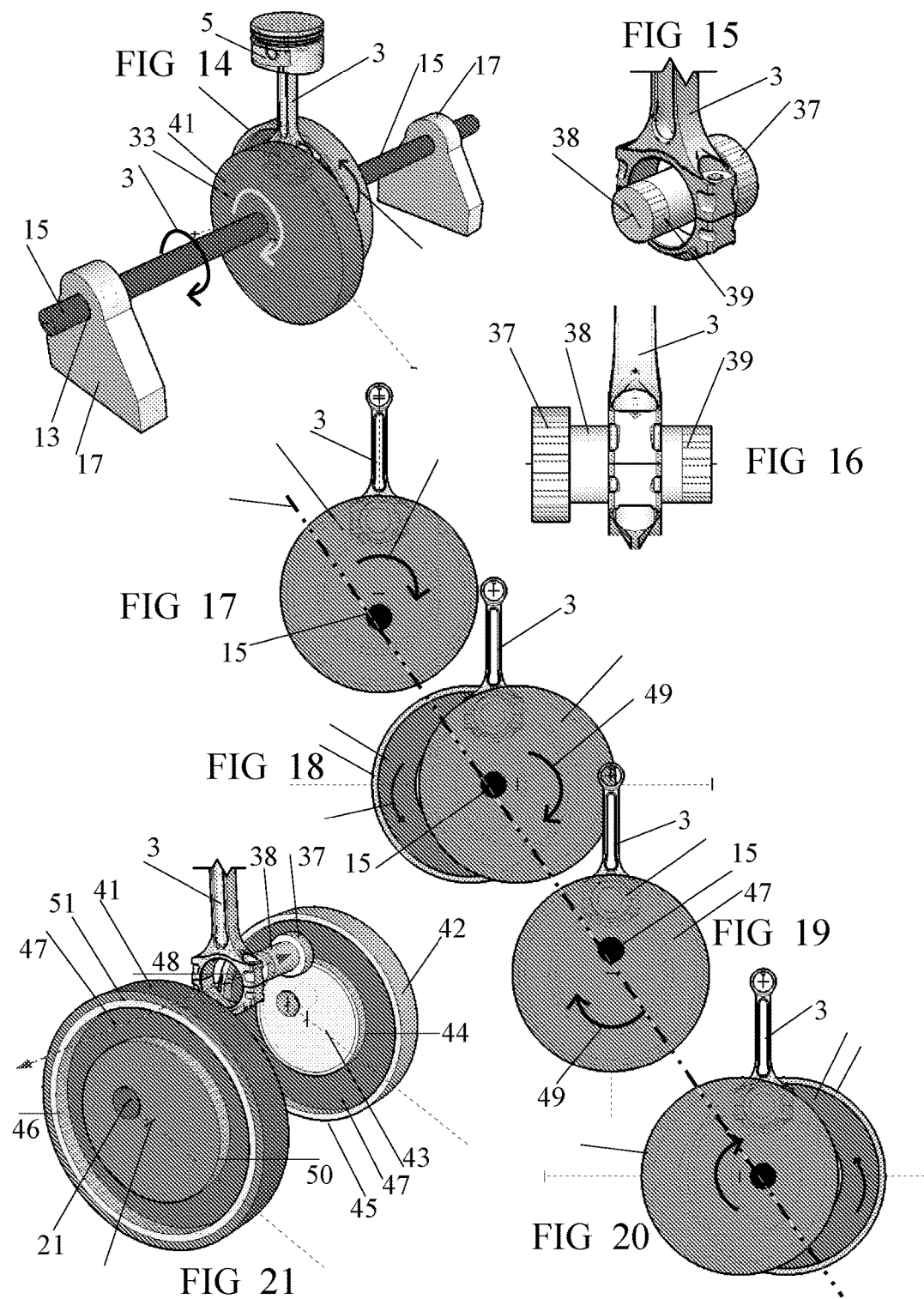

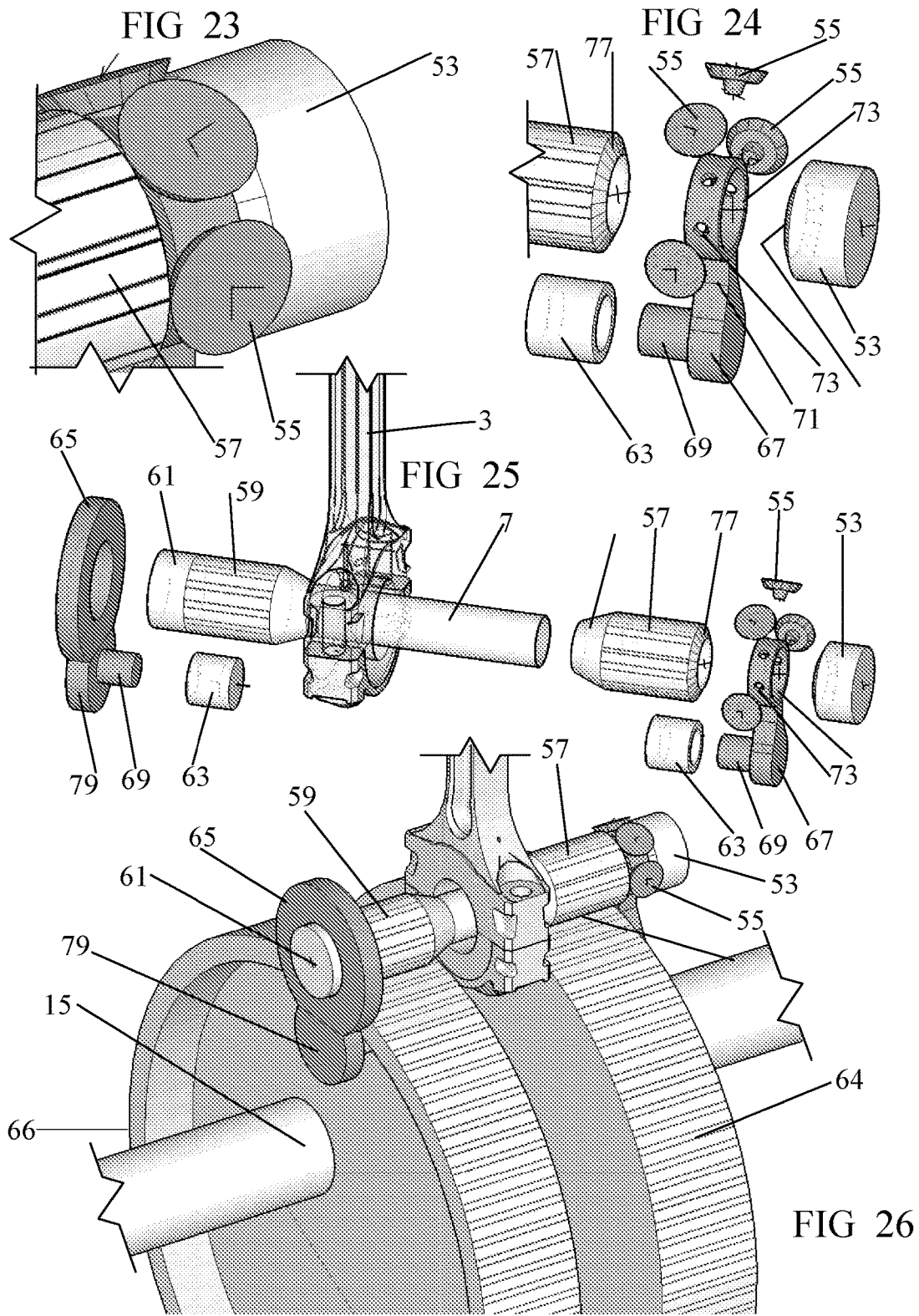

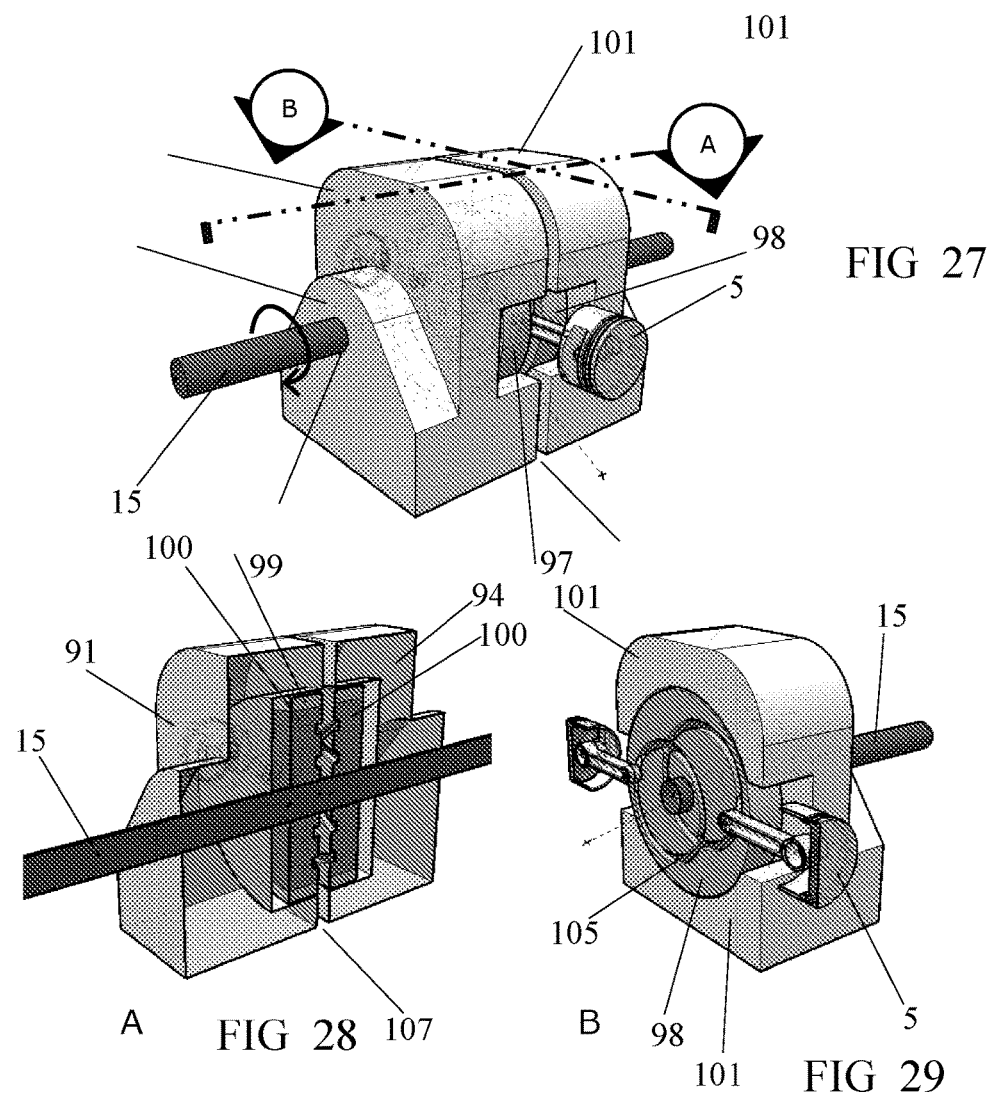

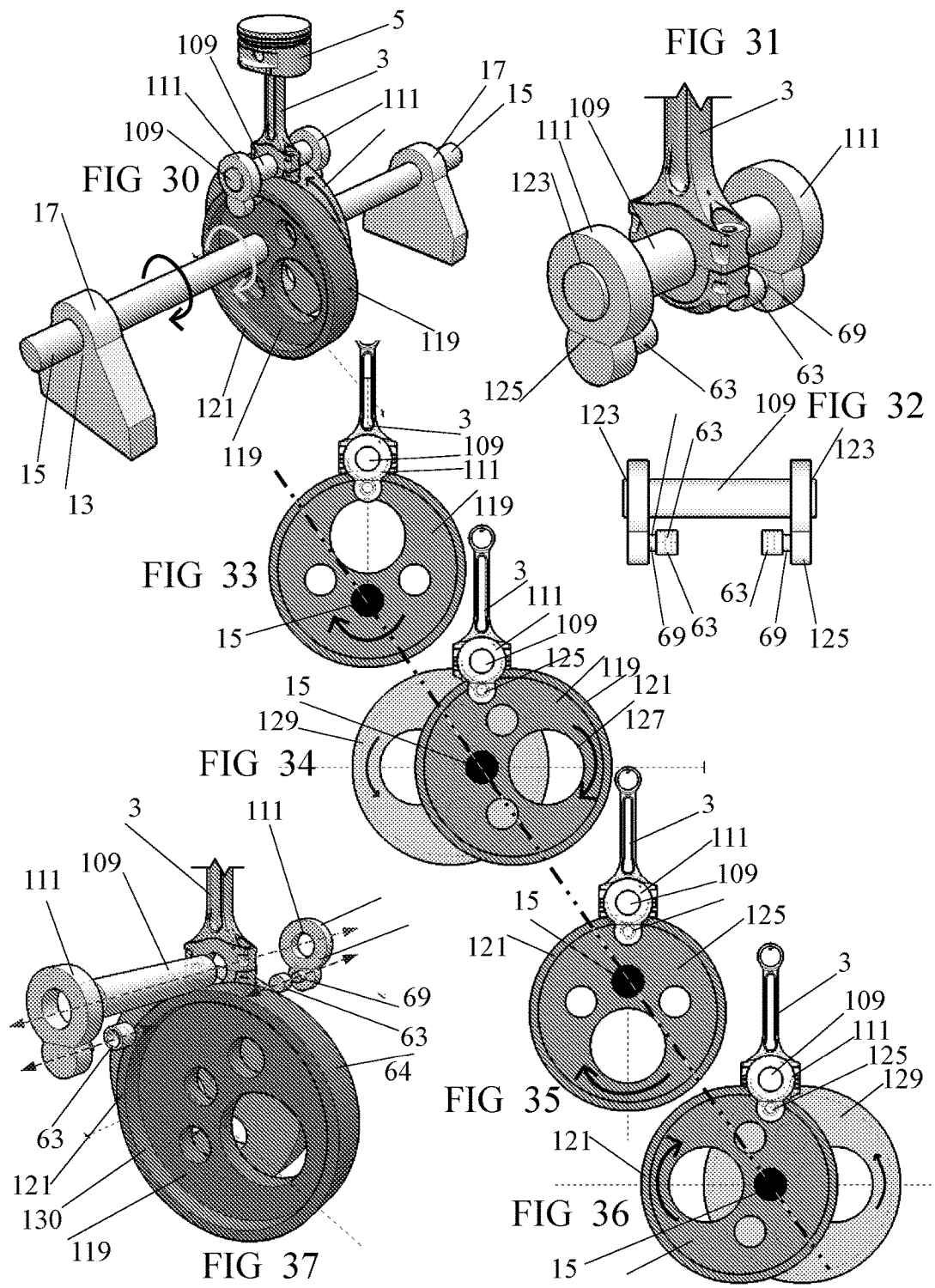

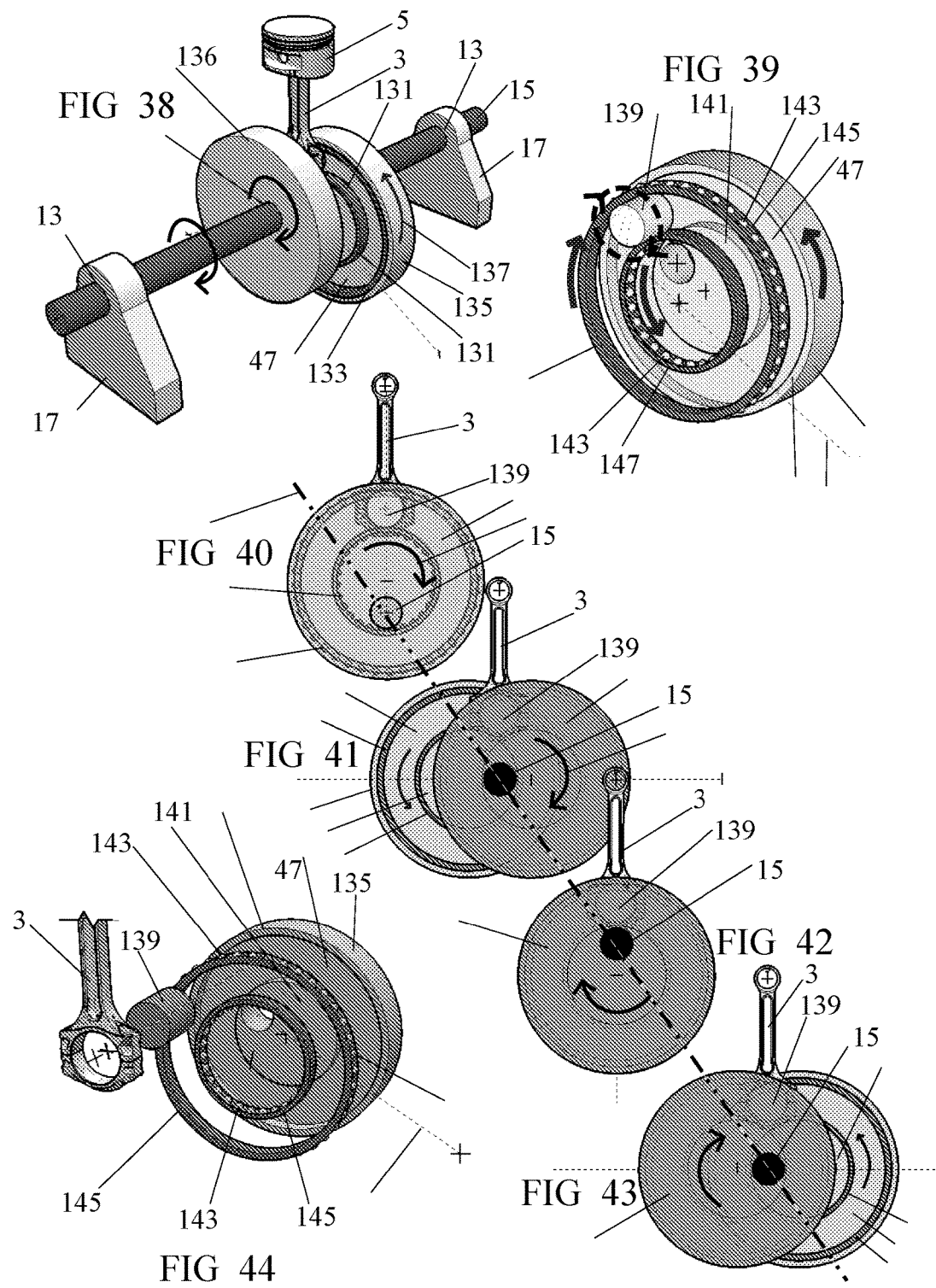

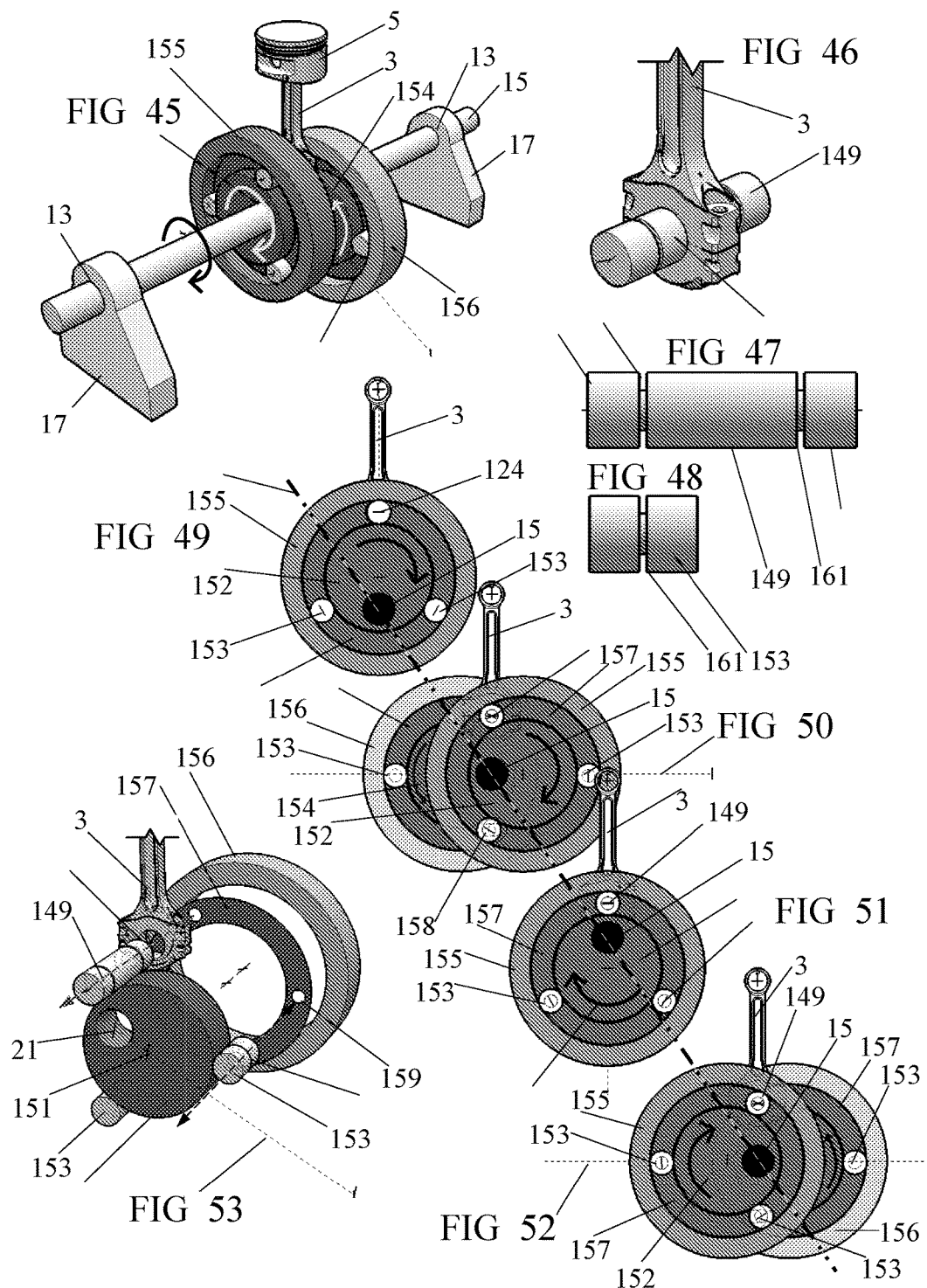

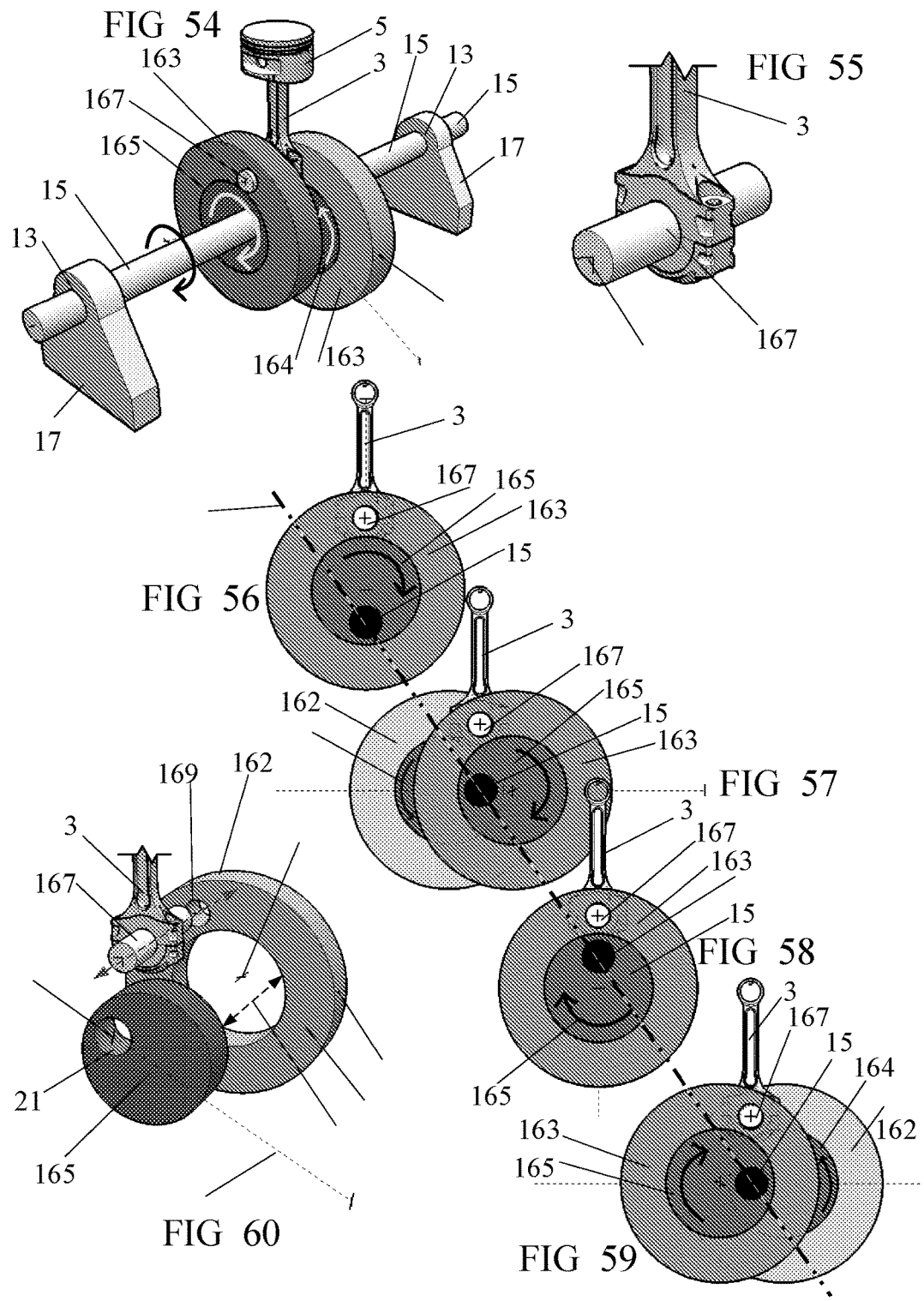

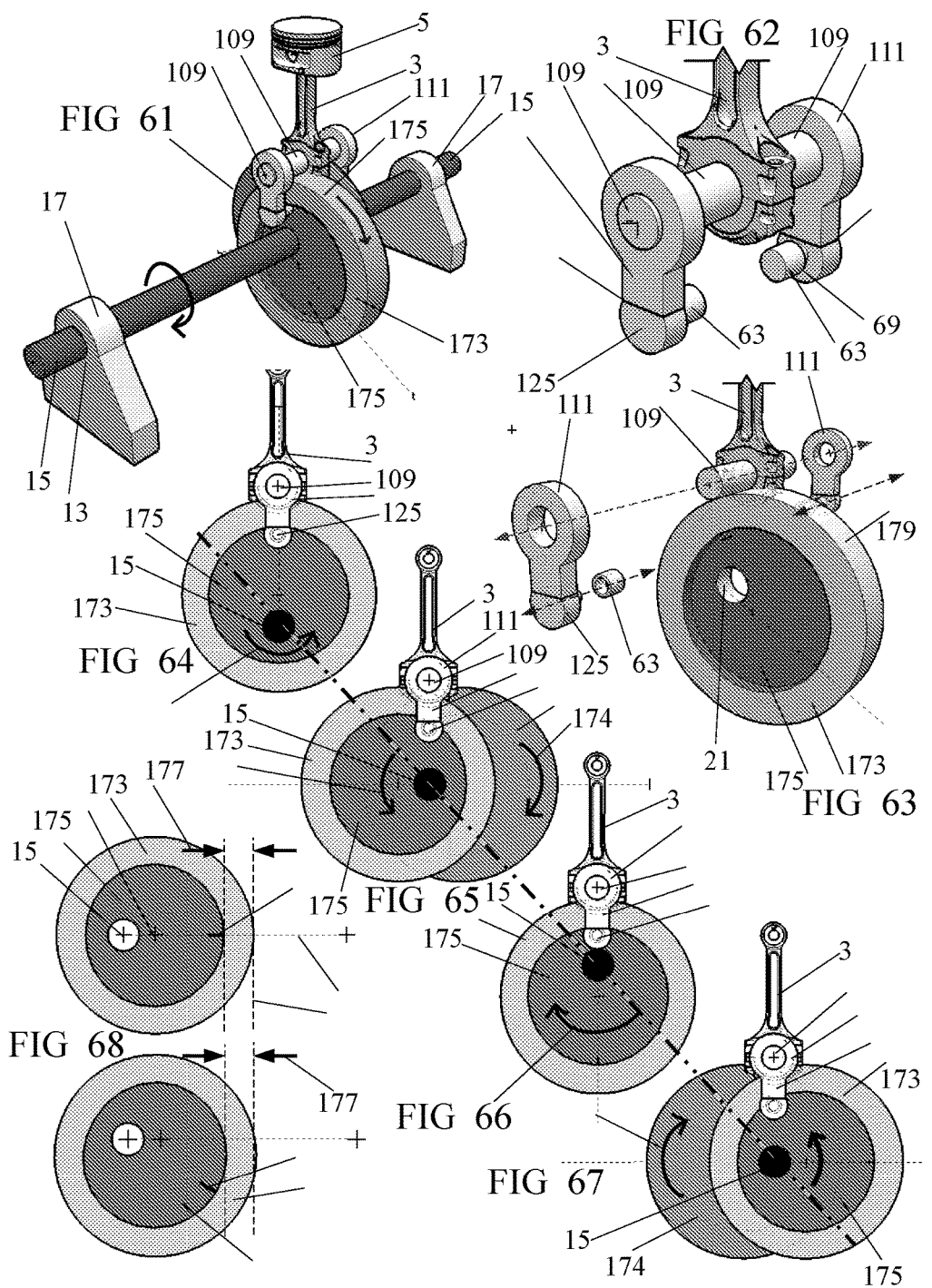

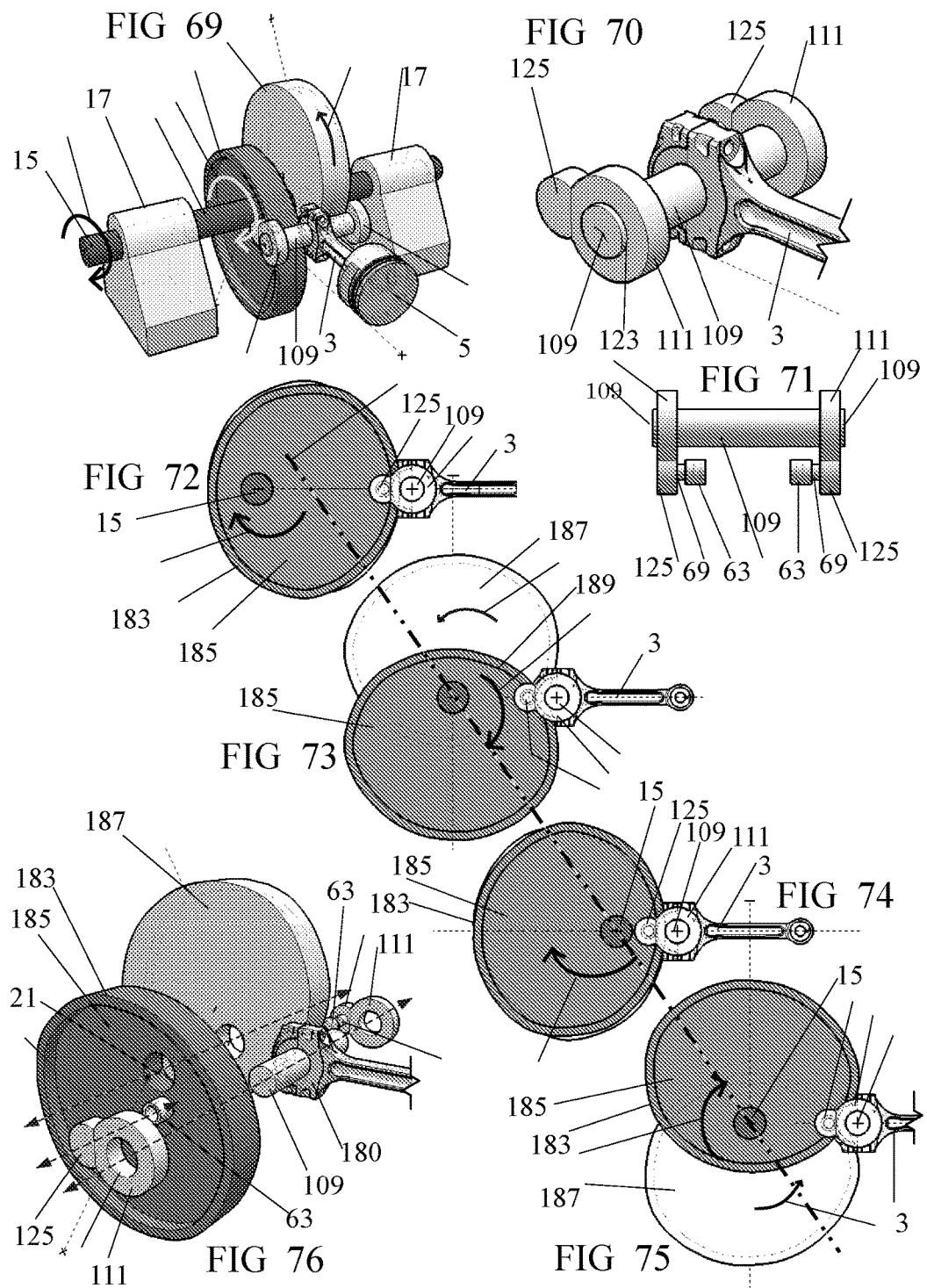

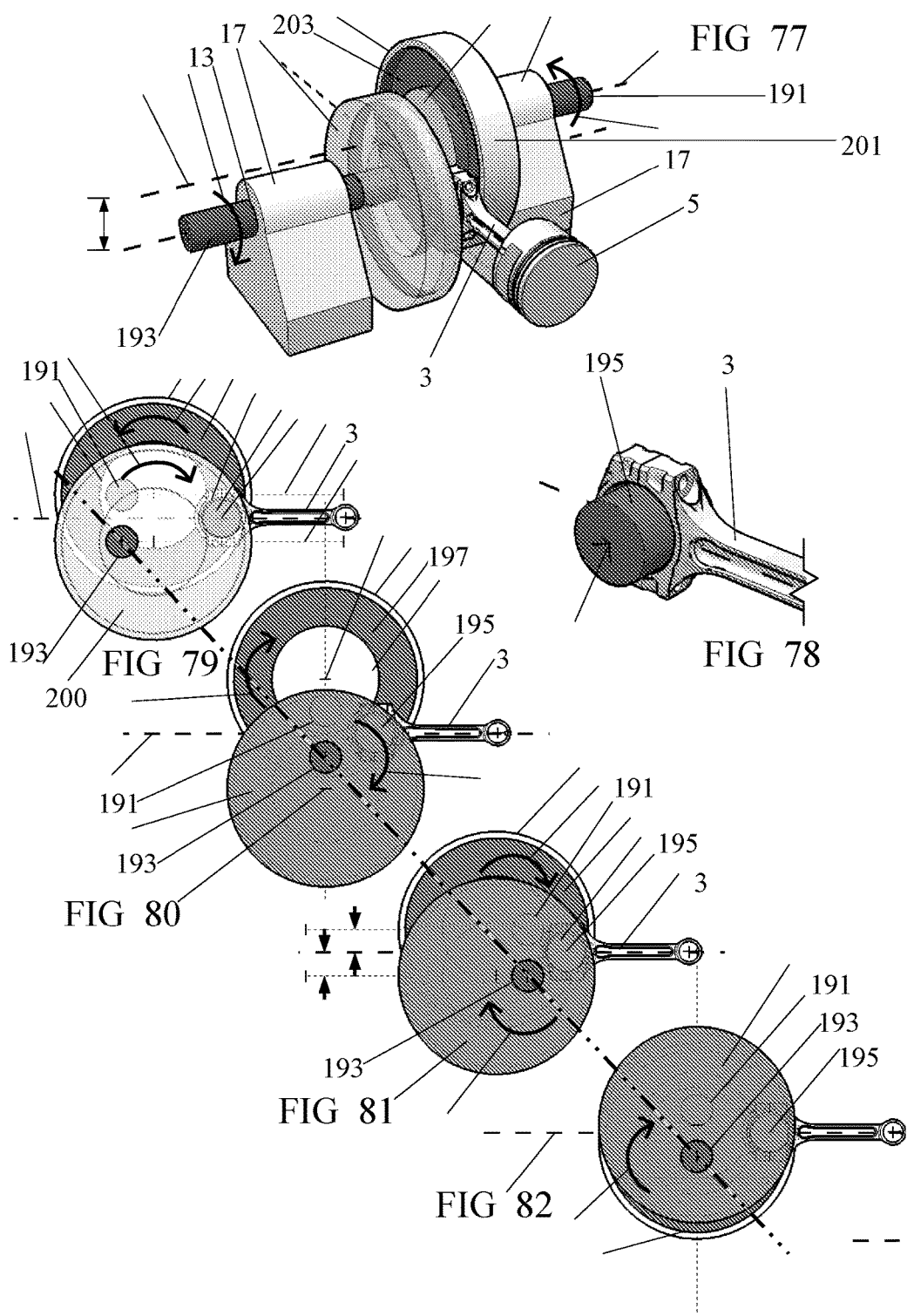

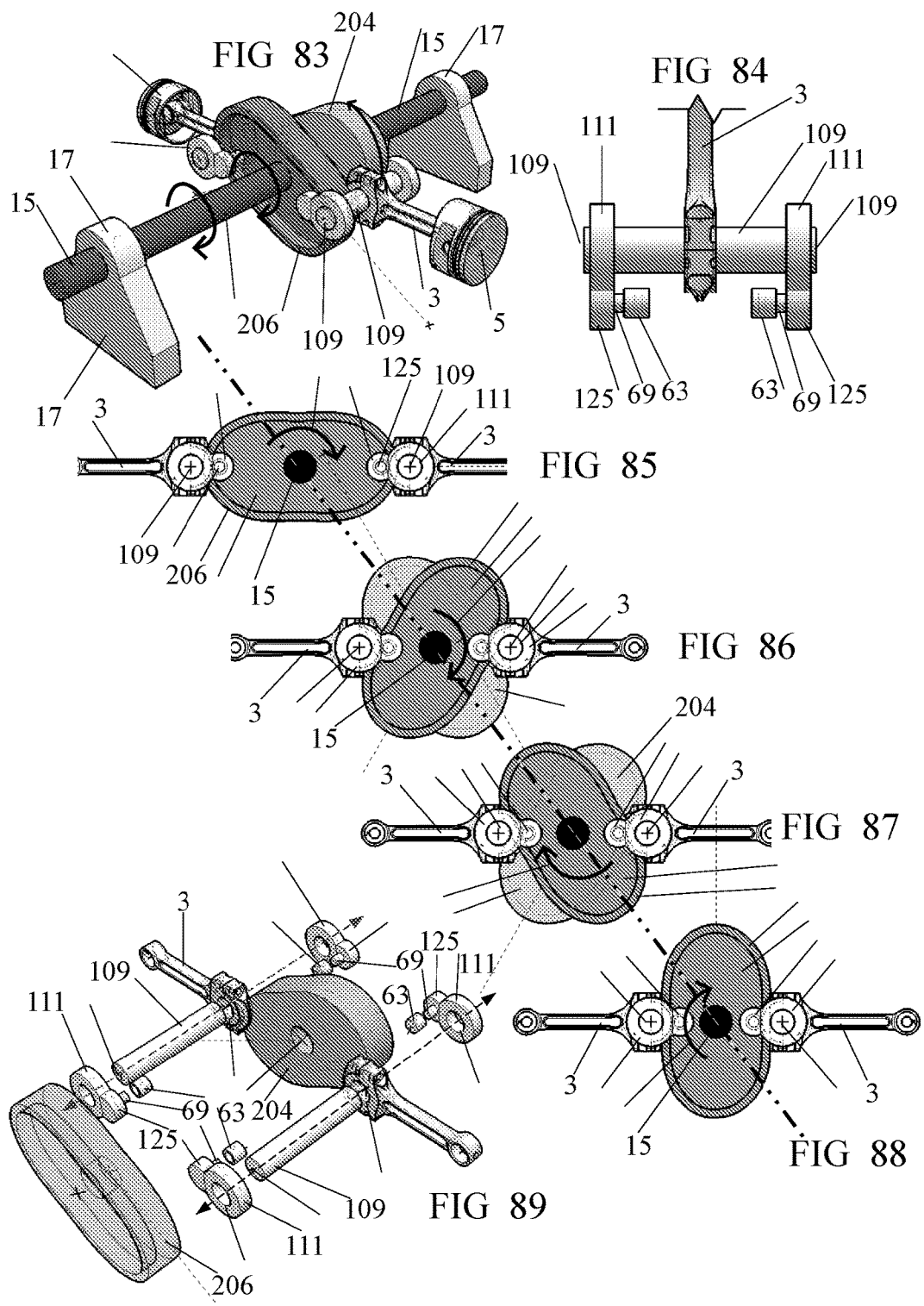

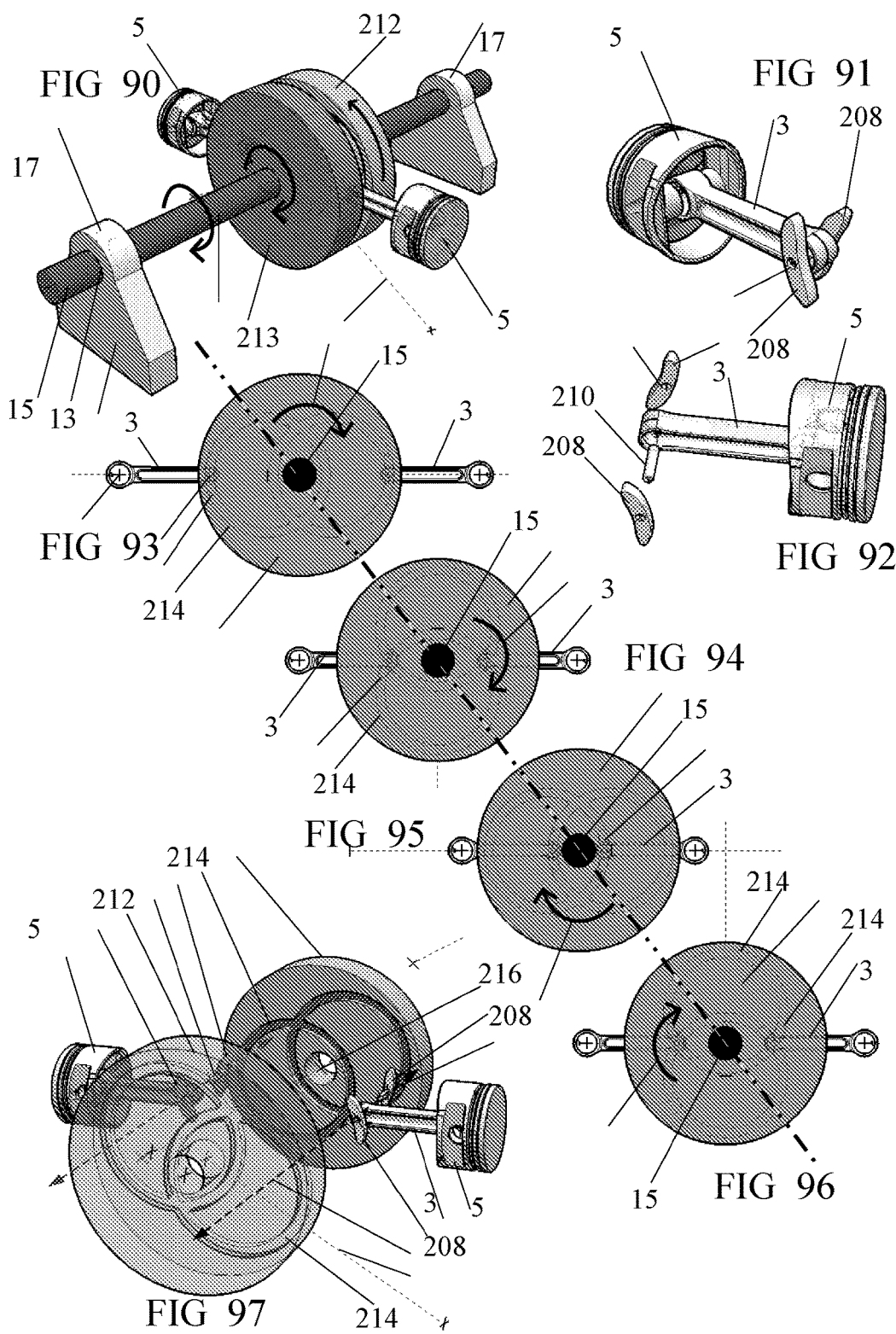

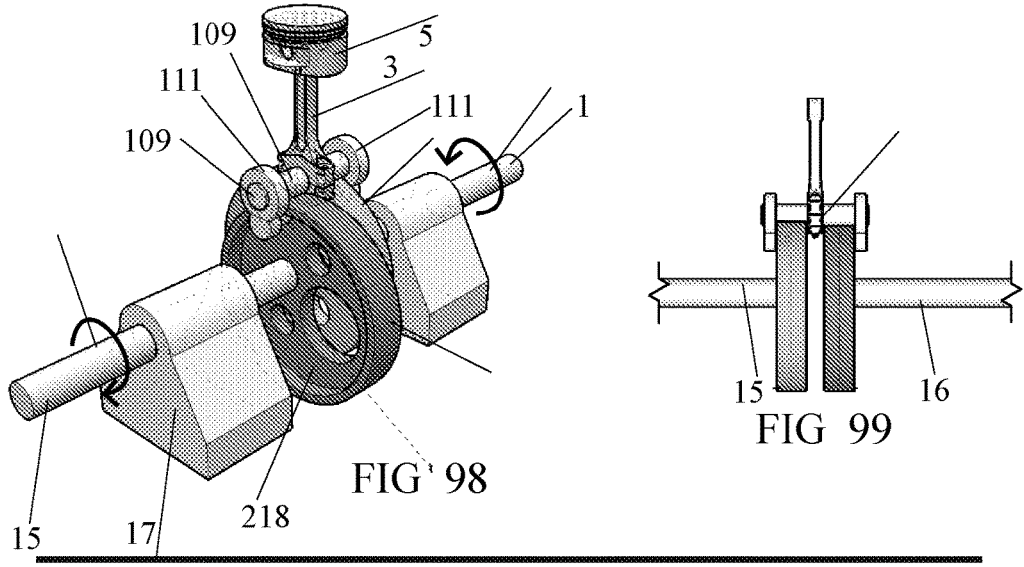
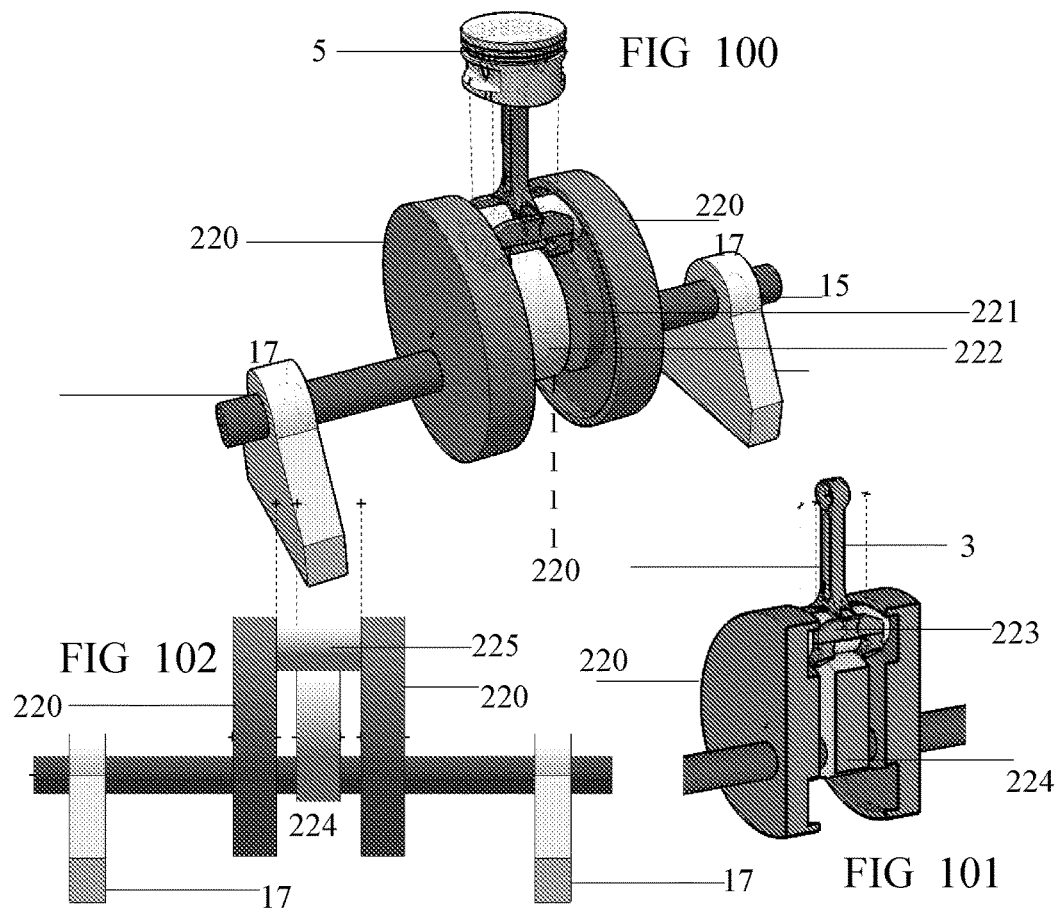

SYNCHRONOUSLY TIMED COUNTERROTATING CAM AND FOLLOWER APPARATUS

Notice: This application is a continuation of International Application No. PCT/US2013/032447, filed on 15 Mar. 2013. Said PCT filing claims priority to U.S. Provisional Patent Application No. 61/611,062, filed on 15 Mar. 2012. In the International Search Report for said PCT filing, the Examiner cited the following patents/applications:
US 2009/0314232 A1 (HOWELL-SMITH) 24 Dec. 2009;
US 2011/0180050 (TERRY) 28 Jul. 2011;
US 2007/0079790 A1 (PATTAKOS) 12 Apr. 2007;
US 2004/0187812 A1 (CZYSZ) 30 Sep. 2004;
US 2007/0210659 A1 (LONG) 13 Sep. 2007;
US 2011/0253081 A1 (GAISER) 20 Oct. 2011;
U.S. Pat. No. 6,698,177 B1 (AKEHI) 2 Mar. 2004

PRELIMINARY DEFINITIONS

Definition of counterrotating cam and follower apparatus—hereinafter also referred to as C-CAFA. An apparatus comprised of at least two counterrotating cams moored for rotation, whose cam surfaces work in cooperation with at least one reciprocating cam follower, said apparatus capable of converting reciprocating motion (of the follower) into rotational motion (of the cams), and visa versa.

Definition of synchronously timed counterrotating cams—For two or more counterrotating cams having the same harmonic order (i.e., said cams possess the same number of cam lobes), said term means that the angular displacement of at least one cam in one direction is ensured to be equal to the angular displacement of at least one cam in the other direction. When counterrotating cams are of different integer harmonic orders, said term means that the angular displacement of at least one cam in one direction is ensured to be equal to an integer multiple of the angular displacement of at least one cam in the other direction. The term "equal" is to be construed generally throughout this application as meaning equal to a reasonable degree of engineering certainty.

In light of the above definitions, a synchronously timed C-CAFA is herein defined as a C-CAFA whose counterrotating cams are synchronously timed.

INTRODUCTION

Please refer to FIG. 1 below for representative drawing of a two cam C-CAFA.

Generally, the prior art relevant to the apparatus embodiments disclosed herein and the equivalents thereof relate to the field of cam and follower apparatuses and or mechanisms which have the ability to convert reciprocating to rotational motion, or visa versa. In the prior art, the above said apparatuses have been utilized, among other applications, within heat engines to transmit power between a reciprocating cam follower, connecting rod, or a piston, or combination thereof, and a rotating drive cam or cams.

Specifically, the prior art of C-CAFA below disclosed relate to the field of apparatuses which utilize two or more counterrotating cams, each such cam possessing at least one cam surface, which cam surfaces jointly act during their counterrotation upon a reciprocating cam follower or followers. C-CAFA have been disclosed in the prior art since at least the U.S. Pat. No. 2,038,024 of Craske, filed in the year 1934. The prior art discloses both two cam and three cam iterations of C-CAFA, all of which prior art apparatuses are shown employed in various internal combustion engines to convert rotational to reciprocating, and vice versa, motion.

The ability generally of said prior art C-CAFA to cancel or to substantially cancel lateral forces exerted on their reciprocating follower or followers by said apparatus's counterrotating cams has been routinely touted by inventors of said apparatuses. Without inferring any limitation or advantage whatsoever as to the structure or function of any C-CAFA, said cancellation of lateral (perpendicular to follower reciprocation axis) forces substantially keeps a piston (when employed in combination with such a C-CAFA, typically affixed to said C-CAFA follower by way of connecting rod) from being be forced laterally against its cooperating cylinder wall, resulting therefore in reduced friction and vibration as compared to those pistons combined with conventional crankshaft, connecting rod combinations (i.e., "crank-slider" mechanisms), or which are combined with single cam and follower mechanisms.

Without limitation as to any other structural or functional differences which may exist as and between said prior art C-CAFA iterations which are discussed below, one structural difference between the two and three cam C-CAFA apparatuses is the additional cam. One functional difference in this same respect is that a three cam C-CAFA follower(s) must cooperate with two cams rotating in one direction and with one (typically center) cam rotating in the other, whilst a two cam C-CAFA follower(s) cooperates with one cam rotating in one direction and another cam rotating in the other direction. Because of the symmetrical lateral force distribution exerted by the cams upon a three cam C-CAFA reciprocating cam follower, said follower does not have the tendency to twist or rotate about its axis of reciprocation. However, the lateral force distribution exerted by the counterrotating cams upon a two cam C-CAFA follower(s) is not symmetrical, and said lateral forces therefore create a periodically alternating pure mechanical couple (e.g., twist or moment) upon the cam follower about its axis of follower reciprocation which is well known in the art. This inherent twisting of the follower in a two cam C-CAFA is hereinafter referred as the follower couple.

All prior art C-CAFA disclosed below, whether of the two cam or three cam persuasion, have taught the use of, or have otherwise employed, or have so taught and employed, stationary geartrains to exclusively perform the function of ensuring that their counterrotating cams maintain their desired counterrotational orientation (e.g., synchronous timing), for all instances where synchronous timing of counterrotating cams was achieved. No prior art C-CAFA has ever taught, disclosed, embodied, nor utilized any structural limitations whatsoever relating in any way to whether or not its reciprocating follower(s) is "adequately constrained" or has "partial fixity" (as those terms are explained herein) by the moving cam surfaces of said apparatuses' cams. Structural limitations of this ilk, together with kinematical and electromechanical structural limitations, will be herein disclosed, then utilized in the novel C-CAFA disclosed herein to ensure said synchronous cam timing, because all C-CAFA embodiments disclosed herein have expressly eliminated stationary geartrains of the prior art.

STATEMENT OF UTILITY

The C-CAFA embodiments disclosed herein and their equivalents are useful as:
 a stand alone differential capable of changing the rotational direction of a shaft;

a stand alone balancing mechanism which, among other configurations, may be mounted upon a shaft which is otherwise experiencing an unbalanced reciprocating mass in order to reduce or eliminate the vibrations induced therefrom, and said C-CAFA may be used in applications wherein the need to convert reciprocating motion to rotational motion, and visa versa, is desired (e.g., a piston engine or pump). The apparatus may be fitted with optional rod and piston, and otherwise combined with a reciprocating engine or pump.

TECHNICAL FIELD

The technical field of the several C-CAFA embodiments disclosed herein relates to cam and follower apparatuses used for the conversion of rotational to reciprocating motion, as well as relates to engines that said apparatuses may be employed in combination with.

INDUSTRIAL APPLICABILITY

The apparatus embodiments disclosed herein and their equivalents may be used in combination with internal combustion engines (ICE's), or pumps, or other systems having a need to convert reciprocating to rotational motion, in addition to the above noted utilities.

UNITY OF INVENTION

Please note that this particular paragraph under the heading of Unity of Invention is the only text in this entire Document which was not part of the Applicant's U.S. Provisional Patent Application to which this PCT Application relates. This paragraph adds no substance to the Description herein whatsoever. Rather, it is a brief summary as to why Unity of Invention is conferred upon all Claims set forth herein. First, all prior art synchronously timed C-CAFA noted herein utilize a geartrain containing at least one gear with a stationary axis of rotation, which gear is a structural connection between, and is a separate structural element from, said cams, to exclusively perform the function of synchronously timing cam counterrotation. All synchronously timed C-CAFA disclosed herein however as noted herein have eliminated such just said prior art (stationary geartrain) structural feature, and said elimination as seen herein is novel. Because the just mentioned non-obvious technical result is common to all synchronously timed C-CAFA embodiments disclosed, specified, and claimed herein, the same constitutes a single general inventive concept conferring unity of invention upon all C-CAFA Claims set forth in this application. Moreover, said elimination of the geartrain as such also constitutes a special technical feature common to all C-CAFA disclosed herein. Moreover, all C-CAFA Claims herein have common functional characteristics, namely, that they function without the above said geartrain, which functionality is also novel. It may also be said that all Claims herein work towards solving the same technical problem, namely, improving the functionality of C-CAFA Mechanisms over those of the prior art.

Inventive Step Determination Via Problem Solution Approach (PSA)

PSA Step 1—Determining the Closest Prior Art Pertaining to Synchronously Timed Counterrotating Cam and Follower Apparatuses (C-CAFA).

The identified prior art references disclosed herein are directed to (at least one) of the same purposes shared by all of the various apparatus embodiments disclosed herein. Namely, the conversion of rotary to reciprocating motion, and visa versa. Note that various apparatuses embodiments disclosed herein may also have other usages, which are disclosed elsewhere in this application. Each prior art reference disclosed herein specifies at least one embodiment purporting to be a reciprocating piston engine employing a synchronously timed C-CAFA. Note that said references may also specify apparatus embodiments which do not employ synchronously timed C-CAFA's.

The technical field of the embodiments disclosed herein relates to cam and follower apparatuses used for the conversion of rotational to reciprocating motion, as well as relates to the internal combustion engines (ICE's) that said apparatuses may be employed in combination with.

Those prior art embodiments disclosed herein which employ synchronously timed C-CAFA, and all of the novel apparatus embodiments disclosed herein, aim at at least one of the same objectives. Namely, the utilization of two or more synchronously timed counterrotating cams to cause a cam follower upon which they act to reciprocate, without said follower experiencing resultant unbalanced forces at right angles to said follower's path of reciprocation. Such unbalanced forces are otherwise inherently exerted upon the cylinder walls of reciprocating piston engines which employ traditional crankshaft, connecting rod, and piston combinations (i.e., crank slider mechanisms). Because of the ability to cancel such unbalanced forces, apparatuses (C-CAFA) employing counterrotating cams acting upon reciprocating followers have been occasionally employed in the art in lieu of such just mentioned traditional crank-slider mechanisms in reciprocating piston engines.

As more particularly disclosed herein, the prior art respecting synchronously timed C-CAFA dealt with the same objective technical problem (OTP) solved by all synchronously timed C-CAFA embodiments disclosed herein. Namely, ensuring that said apparatuses' counterrotating cams are physically synchronously timed in their angular counterrotation. As evidenced below in the disclosed prior art references, said objective technical problem is known in the art. Lastly in terms of the determination herein of the closest prior art, it will be seen below that each of prior art references discloses at least one embodiment having the most positive technical features in common with all apparatus embodiments disclosed herein. Namely, synchronously timed counterrotating cams moored for rotation whose cam surfaces cooperate with reciprocating follower(s).

Apart from sharing the just mentioned positive features with the prior art, all apparatus embodiments disclosed herein physically and expressly eliminate a substantial structural feature shared by all prior art synchronously timed C-CAFA. Namely, all such prior art synchronously timed C-CAFA possess some form of stationary geartrain, each of which geartrain possesses at least one gear with a stationary axis of rotation, which gear is a structural connection between, and is a separate structural element from, the apparatuses' counterrotating cams. All C-CAFA apparatus embodiments disclosed herein are able to synchronize the timing of their counterrotating cams without employing such stationary gears, or geartrains.

Given the above, said prior art disclosed below therefore represents that which requires the minimum of structural and functional modifications to arrive at any of the various apparatus embodiments disclosed herein.

PSA Step 1—Identification of the Prior Art

Two cam synchronously timed C-CAFA exist in the prior art, and are comprised of the following known structural and functional features:

two cams, each of which is structurally moored for rotation;
each of said cams comprised of one or more cam surfaces;
at least one reciprocating cam follower cooperating with said cams' cam surfaces;
at least one gear with a stationary axis of rotation, which gear is a structural connection between, and is a separate structural element from, said cams Specific prior art references comprised of the above said limitations are:

Craske; U.S. Pat. No. 2,038,024, 1934.
Fette; U.S. Pat. No. 2,558,349, 1951.
Howell-Smith; U.S. Pat. No. 5,992,356, 1999 (PCT No. PCT/AU96/00449) and Howell-Smith U.S. Patent Application US 2009/0314232 A1, published Dec. 24, 2009.
O'Neill: U.S. Pat. No. 7,219,631; 2007.

Prior art three cam synchronously timed C-CAFA also exist in the prior art, and are comprised of the following known structural and functional features:

three cams, each of which is structurally moored for rotation;
each of said cams comprised of one or more cam surfaces;
at least one reciprocating cam follower cooperating with said cams' cam surfaces;
at least one gear with a stationary axis of rotation, which gear is a structural connection between, and is a separate structural element from, said cams.

Specific prior art references comprised of the above said limitations are:

Wilson; U.S. Pat. No. 2,407,859, 1946.
Chaneac U.S. Pat. No. 4,848,282, 1989.
Pattakoes, U.S. patent application publication number: US 2007/0079790 A1, Publication date Apr. 12, 2007, application abandoned, Sep. 28, 2010.

PSA Step 2—Establishment of the Objective Technical Problem (OTP) to be Solved.

2a.—Define Distinguishing Features Between the Claim(s) Under Consideration Herein and the Closest Prior Art Without limitation respecting any other structural and or functional apparatus embodiment limitations claimed and specified herein which further distinguish them from the prior art, and while expressly reserving the ability to so further distinguish, applicant submits that at least the below said structural and functional limitations materially distinguish the apparatus embodiments disclosed herein from the prior art.

2a.i. Absence of Prior Art Structural Feature.

No prior art reference regarding synchronously timed C-CAFA has ever taught, specified, nor claimed ensured synchronous cam timing without employing a stationary geartrain, containing at least one gear with a stationary axis of rotation, which gear is a structural connection between, and is a separate structural element from, said cams. The function of said structural (gear) feature in all prior art synchronously timed C-CAFA is to ensure synchronized timing of the counterrotating cams. Said prior art structural feature is physically eliminated from, and expressly disclaimed in, all synchronously timed C-CAFA embodiments disclosed herein.

2a.ii. Novel Structural Features Possessed by Various (as Noted) of the Apparatus Embodiments Disclosed Herein 2a.ii.1 At least one cam follower always structurally in simultaneous and direct contact with at least one and the same particular cam surface of each cam. No prior art synchronously timed C-CAFA possesses the above noted structural limitation.

2a.ii.2.—Finite yet sufficiently small cam and follower surface interface clearance or clearances between cam follower(s) and at least one cam surface of at least one of an apparatuses' counterrotating cams. No prior art synchronously timed C-CAFA possesses the above noted structural limitation.

2a.ii.3.—At least one cam follower rotably connected with at least one cam surface of a first cam and with at least one cam surface of at least a second, counterrotating, cam. No prior art synchronously timed C-CAFA possesses the above noted structural limitation.

2a.ii.4.—at least one magnetized cam and at least one coil capable of conducting electrical current, said at least one coil to cooperate with said at least one magnetized cam. No prior art synchronously timed C-CAFA possesses the above noted structural limitation.

2b. Determining the Technical Effect

The technical results obtained herein by utilization of the above listed novel structural features distinguishing the closest prior art and the claims herein are:

2.b.1.—The technical effect of the absence of the prior art structural feature.

All prior art synchronously timed C-CAFA utilize a geartrain containing at least one gear with a stationary axis of rotation, which gear is a structural connection between, and is a separate structural element from, said cams, to exclusively perform the function of synchronously timing cam counterrotation. All synchronously timed C-CAFA disclosed herein however as noted above have eliminated such just said prior art (stationary geartrain) structural feature. Because the just mentioned technical result is common to all synchronously timed C-CAFA embodiments disclosed, specified, and claimed herein, the same constitutes a single general inventive concept conferring unity of invention upon all claims set forth in this application.

2.b.2. The technical effect of at least one cam follower always structurally in simultaneous and direct contact with at least one and the same particular cam surface of each cam. The technical effect of the above said structural feature is to enable the C-CAFA possessing such structure to be capable of synchronously timing cam counterrotation by and through at least one cam follower and at least one cam surface per cam, acting in combination. No prior art synchronously timed C-CAFA possesses the above noted structural limitation.

2b.3.—The technical effect of finite yet sufficiently small cam and follower surface interface clearance or clearances between cam follower(s) and at least one cam surface of at least one of an apparatuses' counterrotating cams is to enable the C-CAFA possessing such structure to be capable of synchronously timing cam counterrotation by and through at least one cam follower and at least one cam surface per cam, acting in combination. No prior art synchronously timed C-CAFA possesses the above noted structural limitation.

2.b.4.—The technical effect of at least one cam follower rotably connected with at least one cam surface of a first cam and with at least one cam surface of at least a second, counterrotating, cam is to enable the C-CAFA possessing such structure to be capable of synchronously timing cam counterrotation by and through at least one cam follower and at least one cam surface per cam, acting in combination. No prior art synchronously timed C-CAFA possesses the above noted structural limitation.

2.b.5.—The technical effect of at least one magnetized cam and at least one coil capable of conducting electrical current, said coil to cooperate with said magnetized cam, is to enable the C-CAFA possessing such structure to be capable of synchronously timing cam counterrotation by and through the transmission of electromagnetic force between a magnetized cam and coil. No prior art synchronously timed C-CAFA possesses the above noted structural limitation. The technical effects obtained by virtue of the several above listed novel structural features distinguishing the various C-CAFA disclosed herein from the closest prior art are demonstrated and verified in the following sections of this application: The "Adequacy of Constraint and Newtonian Force Analysis, Cam and Follower Surface Kinematical Analysis, and Electromagnetic Cam Analysis" Section; and the "Best Mode, Detailed Description" Section of this application. Both of these sections disclose in detail the technical effects achieved by the C-CAFA embodiments disclosed herein which incorporate such novel structural features, and said Sections also correlate said structural features to their claimed function of ensuring synchronized timing of the C-CAFA's counterrotating cams.

2c. Formulating the Objective Technical Problem Solved Herein

The objective technical problem to be solved herein, which problem is known and common to all prior art synchronously timed C-CAFA, is to mechanically ensure the synchronous timing of said apparatuses' counterrotating cams. Said objective technical problem is formulated herein through distinguishing below the novel structural technical features presented herein from the (stationary geartrain) features of the prior art. The unique and novel features alluded to above of all apparatus embodiments disclosed herein are not found in the prior art, and constitute alternatives to, and technical improvements over, the prior art.

How the Prior Art Solved the Objective Technical Problem

The prior art pertaining to all synchronously timed C-CAFA, regardless of the number of counterrotating cams, solved the above stated objective technical problem (i.e., ensuring synchronized cam timing) by employment of a stationary geartrain containing at least one gear with a stationary axis of rotation, which gear is a structural connection between, and is a separate structural element from, said cams. Functionally, said gear linked the counterrotating cams such that their counterrotation was synchronously timed.

How the Embodiments Disclosed Herein have Solved the Objective Technical Problem How the several above listed unique and novel structural features introduced herein have solved the OTP stated herein is detailed in the "Adequacy of Constraint and Newtonian Force Analysis, Cam and Follower Surface Kinematical Analysis, and Electromagnetic Cam Analysis" and in the "Best Mode and Detailed Description" Sections of this application. As evidenced by the below review of the closest prior art, the above stated objective technical problem is associated with all prior art synchronously timed C-CAFA. Said problem is known to, or is capable of being deduced by, the skilled person from the state of the art and from general knowledge.

2.d.—Has the OTP been Solved?

Demonstration and verification that the OTP has been solved over the whole scope of the claims herein is found in the "Adequacy of Constraint and Newtonian Force Analysis, Cam and Follower Surface Kinematical Analysis, and Electromagnetic Cam Analysis" Sections, and the "Best Mode, Detailed Description" Section of this application.

PSA Step 3—Inventive Step

Advantages—

The advantages which inure to synchronously counterrotating cam and reciprocating follower apparatuses brought about because of the above described alternative solutions include without limitation the following. First, with respect to all synchronously counterrotating cam and reciprocating follower apparatuses known in the prior art, and irrespective of the number of cams which they may have employed, the physical elimination disclosed herein of the presumed necessity of stationary geartrains is, in and of itself, an advantage over said prior art apparatuses. For example, mechanical failure of a prior art stationary geartrain cannot occur if said device does not employ such stationary geartrain in the first place. Moreover, said stationary geartrain elimination optionally gives to the design engineer an increased freedom in terms of apparatus packaging, because no additional space for said stationary geartrain is needed. Optionally, this constitutes an advantage, for example and without limitation, in design applications wherein one of the apparatus embodiments disclosed herein is utilized in a piston engine to convert reciprocal piston motion to rotational motion. To make such incorporation, any prior art synchronously timed C-CAFA so incorporated would have additionally required the installation of a stationary geartrain. Also by way of non-limiting example, because no such stationary geartrain need be designed, budgeted, constructed, and installed, costs associated with the several apparatus embodiments disclosed herein and the equivalents thereof are optionally reduced.

Non-Obviousness

It is seen in the below excerpts from prior art publications, that the prior art of synchronously timed C-CAFA teaches that stationary geartrains are necessary to ensure synchronous timing of C-CAFA counterrotating cams. In contrast, all C-CAFA embodiments disclosed herein have solved the Objective Technical Problem (OTP) of ensured synchronous cam timing by taking a different path, one which wholly dispenses with said stationary geartrains and, instead, utilizes elements and structures (e.g., counterrotating cam surfaces and follower, in combination) not previously used for achieving said OTP.

Prior Art teachings regarding usage of stationary geartrains containing at least one gear with a stationary axis of rotation, which gear is a structural connection between, and is a separate structural element from, said cams are listed below.

Craske; U.S. Pat. No. 2,038,024, 1934. 2 cam, C-CAFA.

See 024 patent at page 1, column 2, lines 16-19 ("Each slipper 14 co-operates with a pair of cams A and B both common in operation to the four pistons and mounted to rotate in opposite directions on a common axis."); at page 2, column 2, lines 39-43 ("it will be apparent from the foregoing that by means of my invention two power shafts are provided which revolve in opposite directions, and are synchronized through suitable bevel gearing, so that they revolve at equal speeds"); and at page 1, column 2, lines 19-21 ("The cam member B is carried by a hollow shaft B1 which rotates upon a shaft A1 carrying the cam member A").

Fette; U.S. Pat. No. 2,558,349, 1951. 2 cam, C-CAFA.

See 349 patent at page 2, lines 29-32 ("The cam disk 34 has secured thereto a ring gear 39 and cam disk 37 has a similar gear 40. Between these two confronting gears on the cam disks, are interposed four smaller bevel gears . . . ."); and at page 3, lines 15-20 ("The gears 41, 42, 43, and 44 in mesh with the gear 39 will start the gear 40 to rotating in the opposite direction to that of gear 39, carrying with it the cam disk 37 and the cam 38". The two cams moving in opposite directions will push inward on the rollers 45 . . . . ").

Howell-Smith; U.S. Pat. No. 5,992,356, 1999 (PCT No. PCT/AU96/00449) and Howell-Smith U.S. Patent Application US 2009/0314232 A1, published Dec. 24, 2009. 2 cam, C-CAFA.

See, for example and without limitation, 356 patent at: ABSTRACT, lines 4-5 ("Differential gearing is provided to time the counter rotation of the cams"); SUMMARY OF THE INVENTION, page 1, lines 54-57 (" . . . and an adjacent second multilobate cam differentially geared to said first multilobate cam for axial counter rotation . . . ") and page 2, lines 58-67 ("The differential gearing which allows counter rotation of the first and second multilobate cams, also times cam counter rotation."); and at BEST MODE FOR CARRYING OUT THE INVENTION, page 4, lines 40-43 (" . . . and differential gearing which will be shortly described."); page 4, lines 43-46 ("The differential, or timing, gearing comprises bevel gear 21 on first cam 8, bevel gear 22 on second cam 9, and pinion gears 23 and 24.); page 4, lines 52-54 ("Second cam 9 can, however, counter rotate with respect to cam 8 but is timed to the rotation of cam 8 by the differential gearing."); page 5, line 9 (" . . . rotation of shaft 7 by way of the differential gear ring . . . "); page 6, lines 13-49 (extensive discussion of the several alternatively structured gear trains used in its FIGS. 5 and 6, concluding with suggestions as to several other alternative gear arrangements which could be employed). Applicant suggests that the Howell-Smith 232 application specification similarly teaches the usage of said stationary geartrains. See, for example and without limitation, paragraph [0007] therein ("second . . . cam differentially geared to said first . . . cam for axial counterrotation . . . . "), and see FIGS. 3-6 therein depicting the intricate gearing employed for cam synchronization.

O'Neill: U.S. Pat. No. 7,219,631; 2007. 2 cam, C-CAFA.

See 631 patent at page 13, lines 51-55 ("In FIG. 9, an alternative embodiment of the present invention is shown wherein each of the drive cams 70a, 70b, include peripheral gear teeth 78 which jointly engage a timing gear 80 to establish and fix the relative angular alignment of the drive cams 70a, 70b); page 13, lines 58-60 ("The timing gear includes bevel or spur gear teeth 82 for intermeshing with bevel or face gear teeth 78 of each drive cam 70a, 70b."); page 13, line 66 through page 14, line 11 ("As such, the timing gear 80 functions to ensure that the drive cams 70a, 70b, maintain their desired angular offset or rotational orientation, while furthermore, serving to effect load sharing between the cams 70a, 70b. That is, whenever a singular input such as, in the present invention, a piston rod 30, effects the transfer of load into two rotating output devices, such as the drive cams 70a, 70b of the present invention, load sharing must be considered to ensure that all of the load is not transferred to only one output device. Consequently, the timing gear 80 also functions as a means for effecting load sharing by causing an overload condition in one of the rotating drive cams 70a, 70b to be transferred to the other of the drive cams 70a, 70b."); page 14, lines 17-24 ("For instances wherein synchronous timing or load sharing are not desired, the timing gear 80 may function solely to drive an auxiliary output drive shaft. Furthermore, while the timing gear 80 is shown as dually functioning to synchronize and provide an auxiliary drive, the timing gear 80 need not engage both drive cams, nor is the use thereof limited to applications having counterrotating drive cams 70a, 70b"); and, lastly on the issue of the 631 patent's employment of a stationary geartrain to achieve synchronous cam timing, the 631 patent's file wrapper, "REMARKS", dated Sep. 7, 2006, page 2, it is stated that "Furthermore, with respect to independent claims 1 and 11 (as amended) none of the cited documents discloses, teaches, or hints at gear teeth on one or more of the drive cams, with an associated timing gear, either to maintain timing and/or load sharing between the drive cams (claim 1 and paragraph [0077]), or to drive an auxiliary output shaft (claim 11).".

Pattakoes, U.S. Patent application publication number: US 2007/0079790 A1, Publication date Apr. 12, 2007, abandoned, Sep. 28, 2010. 3 cam, C-CAFA.

The 790 application teaches the usage of stationary geartrains in connection with any of its synchronously timed counterrotating cams. See 790 application at paragraph [30] ("the problem lies with the driving of the second shaft, it takes at least five gears to accomplish the differential."); at paragraph [033]("The cams are single-lobe and their counter-rotation takes place by means of a pair of gears (13) and (14)."); at paragraph [57] ("In the embodiment of FIG. 8 the two shafts counter-rotate by virtue of the equal gears (13) and (14)."); see also, FIGS. 8, 11, and 13 of the 790 application which all show such gear trains.

Chaneac U.S. Pat. No. 4,848,282, 1989. 3 cam, C-CAFA.

The 282 patent teaches the usage of stationary geartrains to achieve synchronous cam timing. See 282 patent at page 1, lines 40-43 ("According to a feature of the invention, the drive shaft bears at least three cams, a central cam rotating in one direction and two lateral cams rotating at the same speed but in the opposite direction. According to another feature of the invention, the inversion of the central cam and of the two lateral cams takes place by virtue of two planetary gear trains called Pecqueur trains."); and, later, in describing such gear train states at page 2, lines 25-36 ("These planet pinions, bearing on the gears 16 fixed to the crankcase 11, cause the cams 3 and 4 to rotate in the opposite direction to the cam 2 fixed to the drive shaft 1, and at equal speed thereto; . . . ").

Wilson U.S. Pat. No. 2,407,859, 1946. 3 cam, C-CAFA.

The 859 patent teaches the usage of stationary geartrains. See 859 patent at page 2, lines 32-43 (" . . . the invention, as it is exemplified therein, is comprised essentially in an assembly of three substantially identical cam elements 10, 14, and 16, arranged in juxtaposition on a drive shaft 20; the intermediate cam element 10 being keyed to the shaft and the outer cam elements 14 and 16 loosely mounted thereon but indirectly connected to the same by any suitable mechanical means, such as the planetary gearing 22, so that they rotate in the direction opposite to that of the intermediate cam element 10."); and at page 4, lines 34-43 ("For the purpose of insuring of the desired equal and opposite angular displacement between the counter-rotating parts of the drive mechanism assembly, the counter-shaft 58 is connected with the main drive shaft 20', by a train of gears 66, 68, 70, and 72; the gear 66 being keyed on the counter-shaft 20', while the intermediate gears 68 and 70 have suitable bearing in the adjacent wall of a crank-case 44'.").

Applicant suggests that an express prior art teaching of the necessity of a particular structural element in an apparatus is equivalent to a teaching that said element's elimination is undesirable, and, therefore, a teaching away from said element's elimination. As a guidepost, this suggestion is wholly consistent with U.S.P.T.O. Practice pursuant to MPEP (Manual of Patent Examining Procedure), section 2144.04 II. B., wherein the omission of an element with retention of the element's function is an indicia of unobviousness. Specifically therefore, applicant suggests that the above disclosed eight C-CAFA embodiment references, all of which teach the use or necessity of employing stationary geartrains to ensure synchronized timing of C-CAFA counterrotating cams, in fact teach away from the elimination of said geartrains. This is especially true here, where the known function performed by said eliminated stationary geartrains (i.e., ensured cam synchronization) has been retained. MPEP 2144.04 II. B. Because the prior art so uniformly teaches the use of stationary geartrains to ensure synchronized timing of a C-CAFA cams, the reasonable expectation of success that would be anticipated by a design engineer contemplating the elimination of said stationary geartrains is nil.

Apart from the above, none of the prior art disclosed herein contains the affirmative structural limitations and elements which are utilized in the embodiments disclosed herein in order to achieve the OTP of ensuring synchronous cam timing. These affirmative structural limitations were set forth above and include: at least one cam follower always structurally in simultaneous and direct contact with at least one and the same particular cam surface of each cam; finite yet sufficiently small cam and follower surface interface clearance or clearances between cam follower(s) and at least one cam surface of at least one of an apparatuses' counterrotating cams; at least one cam follower rotably connected with at least one cam surface of a first cam and with at least one cam surface of at least a second, counterrotating, cam; and at least one magnetized cam and at least one coil capable of conducting electrical current, said at least one coil to cooperate with said at least one magnetized cam. No prior art synchronously timed C-CAFA possesses any the above noted structural limitations. Moreover, no prior art synchronously timed C-CAFA possesses the functional limitation that it is capable of synchronously timing cam counterrotation by and through at least one cam follower and at least one cam surface per cam, acting in combination. In fact, such just mentioned functional limitation which is utilized in various C-CAFA embodiments disclosed herein is wholly antithetical to the prior art uniform practice of using stationary geartrains to achieve the exact same function, namely, ensured synchronized cam timing in a C-CAFA. Given this fact, the prior art gave no general guidance as to the particular form of the improved C-CAFA embodiments disclosed herein nor how to achieve them.

The exists no prima facie evidence that the several technical solutions set forth herein to the OTP were obvious to try, particularly when said solutions utilize elements (cam surfaces and followers, in combination) which elements never before performed the synchronous cam timing function. That said, none of the various apparatus embodiments disclosed herein involves the predictable use of prior art elements according to their established functions. Rather, they involve using the prior art elements of cams and followers, not according to their established functions, but, rather, to perform a completely new function which they never served to perform previously (i.e., the cam synchronization function). Moreover, because each C-CAFA embodiment disclosed herein and the equivalents thereof include at least one of the just noted novel structural limitations, said embodiments do not constitute so called combination claims.

The prior art gave no indication of which prior art synchronously timed C-CAFA design parameters were critical, nor as to which of a virtually infinite number of possible design configurations might likely be successful. There exists not one iota of teaching, suggestion, or motivation in the prior art to eliminate the exact synchronization devices (i.e., stationary geartrains) which have been uniformly taught for over seventy-five years as fundamental to ensuring timed synchronous cam counterrotation in a C-CAFA. No person has ever publicly postulated that a C-CAFA's counterrotating cam surfaces themselves (since said cams can only rotate, not translate) could be used as moving constraints to prevent lateral translation of a reciprocating follower whilst said follower in turn keeps the cams in sync. See Adequacy of Constraint Analyses, herein.

None of the apparatus embodiments disclosed herein or the equivalents thereof result from the substitution of one known element for another, or from a known technique to improve similar devices to yield predictable results. Rather than substitution of elements, the novelty and inventive step of several of the C-CAFA embodiments disclosed herein derives in part from the removal of a longstanding structural element (i.e., stationary geartrains) while paying new mind to the precise goings on at the cam and follower surface interface (CAFSI) of the apparatus to otherwise achieve synchronous cam timing. See Adequacy of Constraint Analyses, herein.

Moreover, the independent opportunistic recognition here accomplished by the applicant that any cam sufficiently moored for rotation cannot be displaced, and, therefore, that two such cams working in counterrotational unison might be utilized, if desired, as moving constraints sufficient to guide a cam follower in reciprocation, whilst allowing said follower itself to sufficiently sync said cams in their periodic motion, was never remotely a product of any (non-existent) teaching, suggestion, motivation, intimation, or recognition found in the prior art. Nor does prima facie evidence exist of any teaching, suggestion, motivation, intimation, or recognition that the aforesaid cam synchronization function achieved by the cam surfaces and follower, working in combination, could be pursued and ultimately exploited once a concrete engineering correlation between a certain heretofore unrecognized C-CAFA structural condition and the above said cam and follower combination was established as has been here accomplished. Said structural condition is known as Adequacy of Constraint. Said condition and its classical theoretical analytical construct are themselves borrowed from the field of structural engineering. The Adequacy of Constraint of a C-CAFA follower is here classically introduced, and then classically analyzed vis a vis several idealized two cam C-CAFA apparatus exemplars. Then, finally, the strict Adequacy of Constraint principal is somewhat relaxed and used as a guidepost to the engineer to assist the making and using of any of the apparatus embodiments disclosed herein and the equivalents thereof. An engineer's attention to the Adequacy of Constraint criteria and exemplar analyses disclosed herein, and to the actual embodiment disclosures subsequently set forth herein which draw upon said analyses, easily allows for his or her correlation as it were of the above said cam(s) and follower structural combinations and limitations with the above said functional cam timing characteristic. This rigorous analytical correlation as it were of the above said cam(s) and follower structural combination with the above said functional (cam synchronization) characteristic satisfies in letter and sprit the Guidelines for Examination of Patent Applications under the 35 U.S.C. 112 ¶1 "Written Description" Requirement, 66 Fed. Reg. 1099, 1106 (Jan. 5, 2001).

BRIEF DESCRIPTION OF THE DRAWINGS

FIG. 1 shows a face cam C-CAFA, with two cams.
FIG. 2 shows big end of connecting rod with follower.
FIG. 3, 4, 5, 6, show C-CAFA motion sequence for face cam.
FIG. 7 shows exploded view of a cam, follower, and rod bottom.
FIG. 8 shows exemplar cam for adequacy of constraint analysis.
FIG. 9 shows exemplar follower 1 for adequacy of constraint analysis.
FIG. 10 shows exemplar follower 2 for adequacy of constraint analysis.
FIG. 11 shows profile of exemplar cam for adequacy of constraint.
FIG. 12 shows angular relationships of exemplar cams.
FIG. 14 shows cam employing rotating and reciprocating follower.
FIG. 15 shows big end of connecting rod with follower.
FIG. 16 shows profile of dual diameter follower
FIG. 17, 18, 19, 20 show motion sequence of cam employing rotating and reciprocating follower
FIG. 21 shows exploded view of cams and followers for rotating and reciprocating follower
FIG. 27 shows boxer type C-CAFA employing electromagnetic cam
FIG. 28, 29 section views of boxer type C-CAFA with electromagnetic cam
FIG. 30 lip cam C-CAFA
FIG. 31 shows exploded view of follower and rod bottom for lip cam
FIG. 32 shows view of lip cam follower
FIG. 33, 34, 35, 36 show motion sequence of lip cam C-CAFA
FIG. 37 shows exploded view of lip cam, follower, and rod bottom
FIG. 38 shows face cam C-CAFA (two cam) employing MDOF technology
FIG. 39 shows face cam with MDOF surfaces removed for clarification
FIG. 40, 41, 42, 43 show motion sequence of face cam employing MDOF cam surfaces
FIG. 44 shows exploded view of groove cam with two MDOF surfaces, follower, rod bottom
FIG. 45 shows a two cam, ring cam, C-CAFA
FIG. 46 shows ring cam rod bottom and follower
FIG. 47 shows ring cam follower with race troughs
FIG. 48 shows a race roller for ring cam
FIG. 49, 50, 51, 52 show motion sequence for ring cam C-CAFA
FIG. 53 shows exploded view of a ring cam, with the race, two rollers, follower, rod bottom
FIG. 54 shows a two cam, eccentric strap C-CAFA
FIG. 55 shows rod bottom and follower for eccentric strap
FIG. 56, 57, 58, 59 show motion sequence for eccentric strap C-CAFA
FIG. 60 shows exploded view of eccentric strap cam
FIG. 61 shows a two cam, lip cam C-CAFA having constant lip thickness along line of follower reciprocation
FIG. 62 shows rod bottom and follower for lip cam with constant lip thickness
FIG. 63 shows exploded view of follower, rod bottom, and lip cam with constant lip thickness
FIG. 64, 65, 66, 67 show motion sequence for lip cam C-CAFA having constant lip cam thickness
FIG. 68 shows constant lip cam thickness
FIG. 69 shows a two cam C-CAFA, employing lip cams, whose cam profiles are of the constant volume combustion type
FIG. 70 shows rod bottom and follower for constant volume combustion lip cam
FIG. 71 shows lip cam follower
FIG. 72, 73, 74, 75 show motion sequence for constant volume combustion cam
FIG. 76 show exploded view of constant volume combustion lip cam C-CAFA
FIG. 77 shows two cam C-CAFA whose rotational axes are laterally offset
FIG. 78 shows rod bottom and follower for laterally offset C-CAFA
FIG. 79, 80, 81, 82 show motion sequence for laterally offset C-CAFA
FIG. 83 shows two cam C-CAFA employing second harmonic lip cams
FIG. 84 shows rod bottom and follower for second order C-CAFA
FIG. 85, 86, 87, 88 show motion sequence for second order lip cam
FIG. 89 shows exploded view of cams, followers, rods
FIG. 90 shows two cam boxer type groove cam C-CAFA
FIG. 91 shows piston, rod, and followers for boxer C-CAFA
FIG. 92 shows piston, rod, and followers for boxer C-CAFA
FIG. 93, 94, 95, 96 show motion sequence for boxer groove cam C-CAFA
FIG. 97 shows exploded view of boxer type C-CAFA with followers, pistons, and rods
FIG. 98 shows two cam, lip cam C-CAFA with dual output shafts
FIG. 99 shows discontinuous shaft between counterrotating cams in two shaft system
FIG. 100 shows three cam C-CAFA employing outer groove cams and inner eccentric cam
FIG. 101 shows section view of three cam C-CAFA
FIG. 102 shows profile of cams from three cam C-CAFA on shaft.

Figure 13:
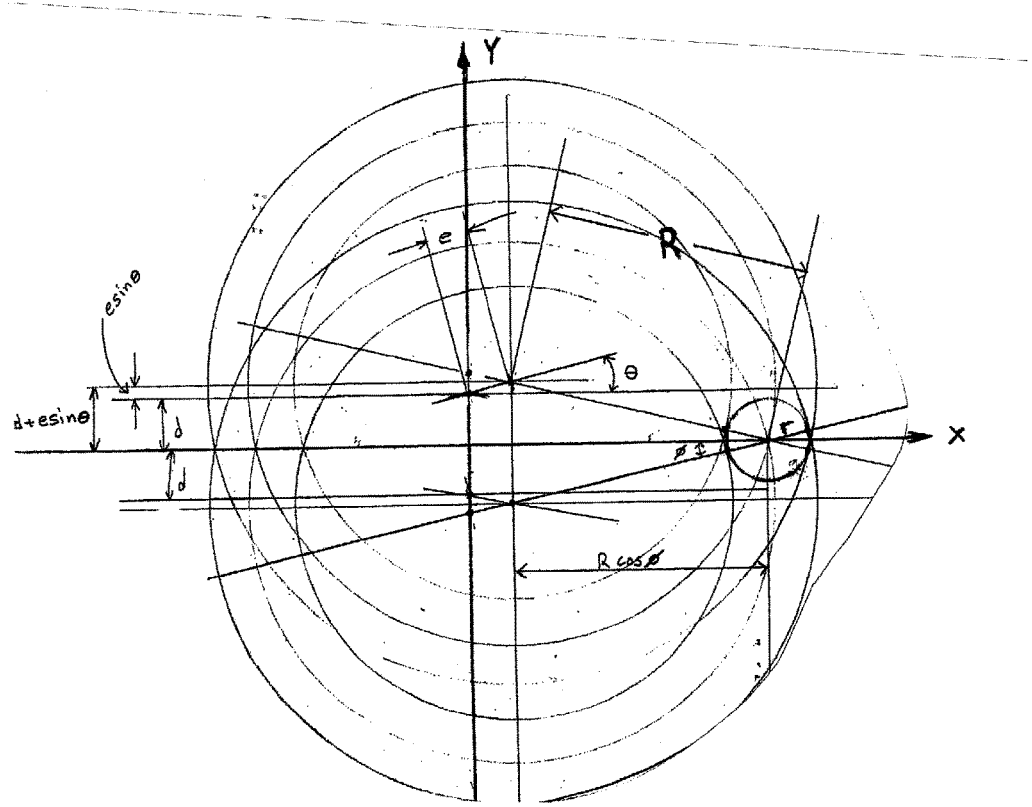
FIG. 13 diagram depicting offset cams.

The following Adequacy of Constraint and Newtonian Force Analysis, Cam and Follower Surface Kinematical Analysis, and Magnetized Cam Analysis, together with the Best Mode and Detailed Specification set forth herein, comprehensively teach the making and using of the several various counterrotating cam and follower apparatuses (C-CAFA) embodiments disclosed herein and the equivalents thereto. Furthermore, said analyses definitively correlate the structural elements of said disclosed C-CAFA embodiments to their inventive concept, namely, achieving the synchronous cam timing function without the necessity of prior art stationary geartrains. It is an object of these teachings to also scientifically demonstrate how the longstanding objective technical problem of ensuring the synchronous timing of the counterrotating cams of a C-CAFA may be alternatively achieved without the necessity of prior art stationary geartrains. Said prior art geartrains all possess at least one gear with a stationary axis of rotation, which gear is a structural connection between, and is a separate structural element from, said (C-CAFA) cams. Several of the advantages of constructing a C-CAFA without said stationary geartrains are duly noted herein.

Adequacy of Constraint Analysis

The determination generally of the adequacy of constraint of a three dimensional object or interconnected system of cooperating elements, is a purely structural phenomenon theoretically grounded upon the principals of Newtonian Statics. Said determination historically has been utilized in the field of structural engineering. The adequacy of constraint analyses here utilized in relation to the several below described wholly idealized exemplar C-CAFA embodiments borrows from the teachings of the college engineering textbook entitled Statics, written by J. L. Meriam, Professor of Engineering Mechanics, Duke University, published by John Wiley & Sons, Inc., New York, U.S.A., copyright 1966, 1971, Chapter 3 "Equilibrium", Article 16 "Adequacy of Constraint", pages 94-99.

In accordance with the above referenced analysis, a three dimensional object is, or an interconnected structure of cooperating elements are, defined as adequately constrained when any arbitrary force and moment combination applied thereto does not disturb said element or structure's equilibrium state. Said equilibrium state means that all six potential degrees of freedom possessed by such three dimensional object or structure are physically constrained as against motion. Our focus here is to determine the physical conditions under which a cam follower of a two cam C-CAFA is adequately constrained (i.e., prevented from any motion) exclusively by the cam surfaces of said C-CAFA's cams, and to make such determination for all possible counterrotational positions of said C-CAFA. In preview of the following discussion, said determination will be instructive as to whether the particular cam and follower geometry examined is capable of ensuring synchronous timing of the counterrotating cams. The adequacy of constraint of several non-exclusive, idealized exemplar two-cam C-CAFA embodiment cam followers is determined below. These adequacy of constraint structural determinations respecting said exemplars are then correlated to C-CAFA functional characteristics through a Newtonian Force Analysis. These analyses will conclusively demonstrate how the principal of adequacy of constraint may be utilized to determine whether a contemplated (e.g., by the design engineer) C-CAFA design/embodiment is capable of synchronously timing its cam counterrotation by and through at least one cam follower and at least one cam surface per cam, acting in combination. The practical teaching results of said exemplar analyses will then be extended to C-CAFA's possessing more than two cams. The theoretical results will then be somewhat relaxed yielding the practical concept of an "effectively adequately constrained" follower which will guide the engineer in making and using the apparatus embodiments disclosed herein. Lastly, said results will be generalized to assist in the design of C-CAFA cam followers possessing so called "partial fixity". See Meriam reference at page 95, explaining that a partially fixed object is one wherein some slight degree of displacement and or rotation must first occur before it becomes constrained, albeit conditionally. Such C-CAFA which possess some finite amount of CAFSI clearances may optionally be useful, by way of example only and without limitation, when sliding follower are selected potentially requiring oil or other lubricant film to wholly or partially occupy some finite CAFSI clearance(s).

In further preview, while looseness of a C-CAFA cam follower due to finite CAFSI clearances destroys effective adequacy of constraint for said follower, a tight fitting follower which has no clearances at its CAFSI does not guarantee said follower's adequacy of constraint, because geometrical factors also have to be accounted for. This is shown in the exemplars. Therefore, in the embodiments disclosed herein which draw upon the teachings of these analyses, the follower fit vis a vis its mating cam surfaces is sometimes referred to as "loose" or "tight". A loose fitting follower (i.e., possessing finite CAFSI clearances) is always technically inadequately constrained, yet may still possibly achieve its synchronization function due to the concept of "partial fixity" above mentioned. Namely, some slight displacement or rotation of said follower may occur before said follower attains sufficient fixity vis a vis cam surfaces to essentially lock and cause the synchronous timing of the counterrotating cams with which it cooperates. An apparatus embodiment possessing such finite CAFSI clearances (i.e., "looseness") should be tested to determine whether it is capable of synchronously timing cam counterrotation by and through at least one cam follower and at least one cam surface per cam, acting in combination. As detailed herein in the Best Mode and Detailed Description, even adequately constrained, "tight fitting" followers should sometimes be tested to ensure that the follower fit, interference or otherwise, is not so tight as to itself impede the proper operation of the C-CAFA.

The following non-exclusive exemplar C-CAFA embodiment examples are here presented and intended solely as POSITA teaching, demonstrative, and confirmatory tools which correlate apparatus structure to function(s), and are here presented without limitation express nor implied vis a vis to the actual C-CAFA embodiments disclosed herein and their equivalents. Any adequacy of constraint computational analysis must necessarily utilize positional coordinates depicting points in three-dimensional space. Therefore several different conveniently oriented Cartesian coordinate systems are employed in the FIGURES depicting said exemplars to ensure an intelligible correlation between the words of this specification and said FIGURES. Solely for the purpose of computational ease, all idealized exemplar (counterrotating) cams possess a circular cam profile of the first harmonic order (i.e., one reciprocation cycle of the follower per one rotation cycle of the cam). Note that the actual apparatus embodiments disclosed herein and the equivalents thereof may have any general cam profile or profiles comprised of any harmonic order or orders.

FIG. 8 shows a view of an idealized C-CAFA, possessing two counterrotating circular (first harmonic) eccentric face cams. The cams are arranged parallel to, and offset (in the Z direction) from, each other, with their common axis of rotation along the Z axis. In FIG. 11, the cam pair is shown in profile, with each cam positioned at the same arbitrary angle "θ", each cam having rotated the same angle θ in opposite directions from a θ=0 position (along the X axis). Note that said θ=0 position of the apparatus represents a so called top dead center ("TDC") position, useful to know for example when said C-CAFA is combined with a connecting rod and piston as a part of a reciprocating engine. The cams in this exemplar each have only one degree of freedom, namely, rotation. This means that said cams are assumed to be sufficiently moored on their shaft of rotation as against all Z axis displacements (e.g., axial displacement of the cam along said shaft might in reality be prevented by, for example, a boss on the shaft). The grooves of said face cams face each other inwardly. The cylindrical follower slots into each groove of each cam. FIG. 8. Note that in this exemplar there are two cam surfaces on each face cam, and said surfaces will be referred to as the inner and outer cam surfaces of the front and rear cams.

FIG. 9 shows the cam follower of the above referenced C-CAFA exemplar, which follower has been removed from between the cams and enlarged. The follower has a width of "w" as measured along the Z axis.

To make any adequacy of constraint analysis meaningful, one must first have or emulate a static system. This we here achieve by imagining both cams to be prevented from rotation during the adequacy of constraint analysis. We prove or disprove adequacy of constraint for a particular follower of a C-CAFA for that particular static position with both cams assumed to be instantaneously fixed as against rotation. Then, the adequacy of constraint analysis will exactly determine whether such constraint will be maintained on the follower for all positions θ. The common $\phi$ angles shown in FIGS. 9, 10 are correlated to the cam θ angle in FIG. 12. Said $\phi$ angles locate the idealized contact points between the follower and cam surfaces (known as the cam and follower surface interface, or CAFSI, points, detailed below). The circular cam profiles for each cam have an effective radius "R", shown in FIG. 12 as measured from the geometrical center of each circular cam to the geometrical center of the circular follower. The circular follower cross-section has radius "r", as measured from the center of the follower to its circumference. The variable "e" represents the eccentricity of each eccentric cam, and is measured from the center of each cam's axis of rotation to its geometrical center. The measurements "R", "r", and "e" are all made within the X-Y plane or planes parallel thereto.

Six arbitrary constraint forces F1, F2, F3, F4, F5, and F6 are now shown. FIG. 9. Their arrows indicate their direction of application, and their arrowheads land on the follower at the position coordinates $r_i$ (as shown below). We shall ultimately determine that four of these forces (i.e., F1, F2, F3, F4) will ultimately effectively control and determine whether the follower, in isolation, is itself actually constrained from all potential motion at the particular apparatus θ angle examined (while the cams are assumed fixed as against rotation).

The $F_i$ each act on the follower at the below coordinate positions. Said respective (X, Y, Z) coordinate positions are designated by the following $r_i$:

$r_1 = (-r \cos \phi, -r \sin \phi, 0)$;
$r_2 = (r \cos \phi, r \sin \phi, 0)$;
$r_3 = (-r \cos \phi, r \sin \phi, -w)$;
$r_4 = (r \cos \phi, -r \sin \phi, -w)$;
$r_5 = (0, 0, -w)$,
$r_6 = (-r \sin \phi, r \cos \phi, 0)$.

The idealized three dimensional follower shown has six potential degrees of freedom. It will therefore take a minimum of six constraint forces to theoretically adequately constrain said follower from all arbitrary potential displacements and rotations, noting again that the present analysis assumes that the cams are temporarily fixed also as against rotation (e.g., they are static) at the angle (and counter angle) θ. The correct geometrical placement of said six constraint forces in this exemplar is necessary to achieve adequate follower constraint with said minimum number (six) of constraint forces. Put differently, six constraint forces are necessary, but as below demonstrated, not necessarily sufficient, for adequate constraint of said follower.

The constraint forces F1-F6 are idealized as mechanical links. Each such link in turn is treated as a two-force (i.e., capable of resisting both compression and tension) member which can only prevent follower displacement along its line of action. As such, each link represents a bilateral constraint. Note however that the nature of the force contact on the follower is compressive only. No tensile forces can be actually generated at these $r_i$ CAFSI contact points in this exemplar. Thus it is required for this theoretical analysis in this particular face cam configuration that no finite CAFSI clearances (a.k.a. engineering slop) exist at said CAFSI contact points. By here eliminating such CAFSI clearances, a potential follower displacement in either direction along an F1, F2, F3, or F4 constraint link imaginary line of action will be prevented by potential compressive reaction forces provided by the cam surface itself diametrically opposed to it located on the opposite side of the follower. In other words, because a force on a rigid body may be applied anywhere along its line of action, a tensile force on one side of the follower is equivalent to a compressive force applied on the other side of the follower along its line of action. Therefore, by so constraining the follower, we may easily model these bilateral forces notwithstanding the fact that only compressive forces in reality may be sustained along said force lines of action. Both F5 and F6 will be treated somewhat differently, as explained below.

It will be assumed that constraint link F5 is an actual physical bilateral link, and note that it is here arbitrarily assumed to be provided by the separate troughs of the two cams here examined on each opposite end of the follower, in combination. Idealized bilateral constraint link F5 representing the above physical situation is seen to make contact with one end of the follower in the Z direction, with its line of action coincident with the cylindrical follower axis (e.g., the Z axis). FIG. 9. Note that such placement of F5 in this example with its line of action intersecting the origin of all coordinates insures that F5 cannot resist potential follower rotation about any of the three coordinate axes, nor can F5 resist any potential follower displacement in either the X or Y directions. The placement of F5 therefore solely resists follower displacement in the Z direction, and the follower is therefore constrained bilaterally from translation in the Z direction exclusively by this idealized link, F5. Notice also for this exemplar that F5 is the only constraint shown which can prevent Z axis translation of the follower.

As to F6, it can only resist a rotation of the follower about the Z axis because it is applied tangentially to the outer circumference of the follower as shown, within the X-Y plane, and at the same $\phi$ angle as F2. Said $\phi$ angle is known as the pressure angle. As configured, F1-F5 do not contribute to preventing such Z axis rotation. Namely, the normal (to the follower surface) constraint links F1, F2, F3, and F4 applied at the idealized CAFSI coordinate points, $r_1$-$r_4$, each of which links lies in the X-Y plane or planes parallel thereto, are only able to resist displacement along their lines of action. Therefore, they cannot resist (at their assumed frictionless contact points $r_1$, $r_2$, $r_3$, $r_4$) any perpendicular follower surface (circumference) rotation at $r_1$-$r_4$. Moreover, F1-F4 produce no moment arm about the Z axis since they all intersect the Z axis. Nor is F5 capable of resisting any such Z axis rotation of the follower with which it is coincident. Such placement of F6 in this analysis is seen to therefore limit F6's contribution solely to constraining Z axis rotation of the follower, and no other constraint link shown can so resist such rotation.

Six unit vectors, $s_n = i\, s_{nx} + j\, S_{ny} + k\, s_{nz}$ are then set up in the directions of the respective links, one for each of the six potential degrees of freedom of the three dimensional follower.

The $r_i$ (e.g., $r_1$-$r_6$) are the position coordinates of the points of application of said constraining links acting on the follower. Newtonian Mechanics requires that all of the possible movements of the follower so constrained then be equated to zero, meaning that no follower displacements in the X, Y, or Z directions, nor rotations about the X, Y, or Z axes, may exist. This equating of all potential follower displacements and rotations to zero results in six equations containing six unknowns of the following form:

$$s_{nx}\Delta x + s_{ny}\Delta y + s_{nz}\Delta z + (r_{ny}s_{nz} - r_{nz}s_{ny})\Delta\theta_x + (r_{nz}s_{nx} - r_{nx}s_{nz})\Delta\theta_y + (r_{nx}s_{ny} - r_{ny}s_{nx})\Delta\theta_z = 0;$$

n=1, 2, 3, . . . 6.

The term $\Delta x$ for example represents a displacement in the X direction and the term $\Delta\theta_x$ represents a rotation about the X axis.

After first determining then substituting the coefficients as above for n=1-6, a six by six matrix of said coefficients is set up. It is known from the theory of homogeneous linear equations that if the determinate of said matrix is non-zero, then the coefficients are all zero, meaning that the follower is adequately constrained from motion of any sort at the arbitrary apparatus position analyzed. Conversely, if the determinate of said matrix is zero, then at least one of the coefficients is non-zero, meaning that displacements and or rotations of the follower are possible and said follower is not therefore adequately constrained.

Based upon the above, the 6×6 matrix of the coefficients respecting the six potential movements or degrees of freedom is:

|  | $\Delta x$ | $\Delta y$ | $\Delta z$ | $\Delta\theta_x$ | $\Delta\theta_y$ | $\Delta\theta_z$ |
|---|---|---|---|---|---|---|
| n = 1 | cos φ | sin φ | 0 | 0 | 0 | 0 |
| n = 2 | −cos φ | −sin φ | 0 | 0 | 0 | 0 |
| n = 3 | cos φ | −sin φ | 0 | −w sin φ | −w cos φ | 0 |
| n = 4 | −cos φ | sin φ | 0 | w sin φ | w cos φ | 0 |
| n = 5 | 0 | 0 | 1 | 0 | 0 | 0 |
| n = 6 | −cos φ | −sin φ | 0 | 0 | 0 | R |

The determinate of the above matrix is equal to zero (0) for all φ angles, and, consequently, the follower shown in FIG. 9 is not adequately constrained for any φ angle, or, put differently, for any allowable counter-rotational position of the idealized apparatus embodiment.

The above analysis demonstrates that it was not the existence of any finite clearances (e.g., engineering slop) at the four ($r_1$-$r_4$) cam and follower surface interface (CAFSI) contact points which thwarted success, because their were no such clearances. There were no such clearances because the above idealized constraint configuration translates physically into the fact that said follower was necessarily landed into the cam grooves without CAFSI clearances (which, in reality, may easily be obtained by, among other ways, an interference fit). Rather, it was the incorrect geometrical placement of the constraining force links F1-F4 which exclusively caused inadequacy of constraint to be demonstrated. By allowing such force links to be in part collinear with each other, the effective number of constraints was reduced below the minimum of six, and inadequacy of constraint from a purely geometrical constraint placement deficit resulted. The above statement that inadequacy of constraint was caused, not by the placement of F5 or F6, and not because of finite CAFSI clearances at $r_1$-$r_4$, but, rather, by the incorrect geometrical placement of the normal forces F1-F4, will be unequivocally demonstrated below. This exemplar teaches therefore that each cam/follower CAFSI contact needs to have sufficient depth in the Z direction (where, as in this exemplar, the follower ends land in their respective cam groves).

In view of the above, FIG. 9 now has its constraint geometry modified to eliminate the collinear nature of the constraint pairs F1, F2 and F3, F4. Rather, each of these constraint force pairs are now separated by a distance, "t" as measured along the Z axis. FIG. 10. This modification in constraint link placement now results in the following modified matrix of coefficients:

|  | $\Delta x$ | $\Delta y$ | $\Delta z$ | $\Delta\theta_x$ | $\Delta\theta_y$ | $\Delta\theta_z$ |
|---|---|---|---|---|---|---|
| n = 1 | cos φ | sin φ | 0 | −t sin φ | t cos φ | 0 |
| n = 2 | −cos φ | −sin φ | 0 | 0 | 0 | 0 |
| n = 3 | cos φ | −sin φ | 0 | −(w + t) sin φ | −(w + t) cos φ | 0 |
| n = 4 | −cos φ | sin φ | 0 | w sin φ | w cos φ | 0 |
| n = 5 | 0 | 0 | 1 | 0 | 0 | 0 |
| n = 6 | −cos φ | −sin φ | 0 | 0 | 0 | R |

The determinate of the above matrix is equal to zero (0) only when:

$$(\sin^2 \phi)(\cos^2 \phi) = 0.$$

It is seen from FIG. 12 that φ may only range from zero (0) to some angle less than 90 degrees for any allowable counter-rotational position of the apparatus' cams. Therefore, cos φ is always non-zero throughout the entire rotation of the apparatus. Consequently, the follower can only be inadequately constrained when sin φ is equal to zero (0). This occurs when φ itself equals zero (0), which apparatus position corresponds to θ angles of 0 degrees and 180 degrees for the circular eccentric cam here exemplified. Therefore the above analysis results in the follower shown being now theoretically inadequately constrained by cam surfaces at θ angles of 0 degrees and 180 degrees, yet adequately constrained for all other arbitrary angles of 0.

These two just noted θ angles of theoretical inadequate constraint correlate with what are known in the art of cam and follower mechanisms as zero pressure angle positions (herein coined as ZPAP's). Said ZPAP's will identify angular positions where an otherwise adequately constrained C-CAFA embodiment's follower is not constrained in the lateral direction (i.e. perpendicular to direction of follower reciprocation) by the cam surfaces of said apparatus embodiment's synchronously counterrotating cams.

Apart from pure theory, as a practical matter and as detailed below, such ZPAP's, when they do exist, are of little or no physical concern. Namely, and continuing with this practical teaching point, any engineer who optionally seeks additional follower (lateral) constraining action at said ZPAP's may select from several follower element and cam structure combinations specified herein, or from their equivalents, which can provide lateral follower support at such ZPAP's. These include, without limitation, C-CAFA embodiments possessing sufficient CAFSI friction (provided, for example, by an actual interference fit), followers and cam surfaces with gear teeth, and actual apparatus embodiments (described below) which have no ZPAP's. (i.e., ZPAP's may be optionally eliminated by laterally offsetting the counterrotating cam axes relative to each other, see below).

For this particular circular eccentric (first harmonic order) exemplar, the center of the follower can be represented by the variable X as measured along the X axis from the origin of coordinates shown in FIG. 12. That said, the relationship between X and $\theta$ is:

$$X = e \cos \theta + R\sqrt{1-(e^2/R^2)\sin^2\theta}$$

The above equation is exactly the same as the equation relating piston displacement to crank angle in a common crankshaft—connecting rod apparatus used in reciprocating piston engines or pumps. The well known in the art variables of connecting rod length, "l" (e.g., pronounced as "el"), and crank throw, "R'", are simply here replaced with "R" and "e", respectively. Note that, in the art, "R'" is normally represented without the prime (e.g., no ' symbol), but is here designated as "R'" so as not to confuse it with the variable "R" which is uniformly used herein to represent the effective radius of the above eccentric cams. Next, we examine how, if desired and solely at the option of the engineer, to eliminate so called ZPAP's from this sort of C-CAFA embodiment by simply offsetting the cams axes laterally (in the "Y" Direction). Such offset shafts also create what is known as a "quick return mechanism".

FIG. 13 details the geometry of such an offset shaft C-CAFA. It is there seen that the two cams shown in profile in FIG. 12 are now laterally offset from each other a distance "d" in the Y direction in FIG. 13. Key to a quick understanding of FIG. 13 is that the $\phi$ angles, precisely as they are in FIGS. 9, 10, and 12, are all still equal to each other, and are all easily and identically substituted therefore into the prior (FIG. 10'S) matrix as is. Therefore, the same computational outcome ensues for this offset shaft scenario, namely, that the representative matrix determinate is still equal to zero (0) only when:

$$(\sin^2 \phi)(\cos^2 \phi) = 0.$$

Yet, by inspection of FIG. 13, and provided that the below conditional requirements special to such laterally offset counterrotating cams (e.g., between the variables "R", "e", and "d") are met, it is seen that $\phi$ can never equal zero (0) for any apparatus angle of $\theta$ and, once more, $\phi$ is always less than 90 degrees. Therefore, neither $\sin \phi$ nor $\cos \phi$ can ever equal zero (0). This means that the determinate of FIG. 13's matrix is always non-zero, thus its follower is adequately constrained for all apparatus positions. Thus, by offsetting said cam axes laterally, the idealized apparatus is now seen as adequately constrained for all allowable $\phi$ angles because it possesses no ZPAP apparatus embodiment positions.

The above mentioned conditional requirements for the above FIG. 13 are:
d>zero (0); e<d, and (R−e)<d, In all cases, it is seen by idealized FIG. 13 that (R−e) must be less than d. Should the engineer optionally wish to have e>d, then the apparatus embodiment will again have two ZPAP positions, much like FIG. 10 which did not possess a lateral offset of the cam axes. The equation relating these last introduced variables for FIG. 13 with the position of the center of the follower along the X axis is:

$$X = e \cos \theta + \sqrt{R^2 - (e\sin\theta + d)^2}$$

It will be seen by the many FIGURES in this application simulating synchronous cam counterrotation at sequential angles $\theta$ that there exists (and in this example, a circular) a locus created by the four constraints, F1-F4, at their four CAFSI points of contact, which, when viewed in profile, will move reciprocally along the X axis as the cams infinitesimally or otherwise counterrotate under the action of an applied horizontal (X axis) force on the follower (i.e., like an internal combustion engine gas force urging an optional piston connected to said follower). In the idealized perfectly adequately constrained theoretical analysis exemplars as above, the circular follower exactly fits within this traveling locus at each unique position $\theta$ of the cams. Said follower thereby provides a link between said cams, said link having but one degree of freedom (neglecting Z axis rotation) during the motion of the apparatus, namely, moving reciprocally within this locus, whose center translates along the X axis. The follower remains throughout said motion with its central axis horizontal (perpendicular to the Y axis) and true (parallel to the Z axis), without displacements in the XY plane (apart from its horizontal movement along the X axis) and it suffers no follower rotations about either the X or Y axes, while its center is seen as a point perfectly reciprocating along the X axis when viewed by an observer in profile. FIG. 12. It cannot be overstated that by urging the follower along its path by an applied force as below, this locus created solely by cam surfaces is made itself to reciprocate with the follower exactly fitting inside of it. We will begin the Newtonian Force Analysis on the follower which was determined to be adequately constrained. FIG. 10. No Newtonian Force Analysis could ever be performed on a statically unstable (i.e., indeterminate) follower of the ilk determined in our first example. FIG. 9. An applied Force, designated as $F_a$, (e.g., Force applied) is thus applied to the follower center at an arbitrarily selected distance (w/2) from the coordinate origin as measured in the negative Z direction, with the direction of application of $F_a$ being in the negative X direction. FIG. 10. This force would be consistent with the force of gas pressure on a piston connected to said follower. The above reviewed familiar links F1-F4, each of them maintaining its previous directional orientation and point of application as they were in the above statically determinate and adequately constrained follower of FIG. 10 now serve to represent to us the reaction forces to such applied force, $F_a$, said reaction forces generated by the (four) cam surfaces acting on the follower. Once again, it is assumed that no CAFSI clearances exist at contact points $r_1$-$r_4$. This idealized analysis assumes the application of said forces as point forces.

As to any force analogous to link F5 discussed in the prior exemplars, note that no force is presently applied in any direction parallel to the common cam rotation (Z) axis. Such condition would be consistent with a standard crank, rod, and piston combination, or a standard cam and follower combination, wherein forces applied parallel to the crank or cam axis of rotation are assumed to be zero or negligible. Said follower in FIG. 10 is therefore assumed to be constrained as against translation in the (Z) direction, without regard to the means therefore.

Along this same line of reasoning, neither is any force analogous to link F6 (as was discussed above) applied. Note that all forces, both applied ($F_a$) and reactive (F1-F4), have lines of action through the follower axis, and, therefore, cannot cause rotation of the follower about that axis. And even if rotation about said axis could occur, in this case with a symmetrical follower cross-section, the geometry of the follower vis a vis the apparatus would not change post rotation, and, therefore, neither would the reactive forces F1-F4 change in their magnitude nor direction. Therefore, F6 is neglected, as is any arbitrary rotation of said follower about the Z axis.

That said, and because said follower is now known to be adequately constrained at this arbitrary, non-ZPAP, φ position, a static force analysis according to Newton's Laws may now be accomplished, noting once again that said cams are still assumed fixed as against all movement, and that the idealized system remains weightless and frictionless.

The results are as follows:

$$F1=(-)F_a(w/4t \cos \phi);$$

$$F2=(-)F_a(w+2 t/4t \cos \phi);$$

$$F3=(-)F_a(w/4t \cos \phi);$$

$$F4=(-)F_a(w+2t/4t \cos \phi).$$

The above negative signs indicate that said reactive forces F1-F4 are actually in directions opposite to that shown by the force vector arrows in FIG. 10. This is due once again to the fact that only compressive reaction forces can be sustained (as above discussed) on the follower in this face cam example with its internal groove having an inner and outer cam surface. Because a force acting on a rigid object may be applied anywhere along its line of action, a "tensile force" on one side of the cam (which is not physically possible, as discussed), is the exact same as the same force shifted along its line of action to the other (opposed) side of the follower where it may properly assert a compressive impetus.

It is seen that, due to symmetry, for either cam end of the follower, the net applied forces to both cams in the direction of follower reciprocation are equal. For the near cam then, this force is:

$$F2 \cos \phi - F1 \cos \phi = (-F_a(w+2t/4t \cos \phi))\cos \phi - (-F_a (w/4t \cos \phi))\cos \phi = (\tfrac{1}{2})F_a.$$

We have now established a statically determinate, adequately constrained follower, within our exemplar C-CAFA, FIG. 10, which has a known applied force system. Next, we let the system move as it was intended under the action of such applied force.

Virtually unchaining the cams from their virtually fixed position, they are now free to rotate, rotation being their only degree of freedom. Therefore, by applying $F_a$ as shown at the center of the follower, each cam experiences an applied, unbalanced, force equal to one-half of $F_a$ in the same $(-X)$ direction. Dynamically, $F_a$ will therefore cause said cams, linked by their follower, to counterrotate the same angle (assuming, as in this example, that each counterrotating cam profile is identical to each other). In an actual case of an arbitrary C-CAFA embodiment possessing weight and friction, said $F_a$ will need a magnitude sufficient to overcome friction, inertia of the follower, and the rotational (moments of) inertia of the cams and shaft upon which they are mounted to cause apparatus motion. At this point in these analyses, it is worth remembering that although said cams are now free to rotate, they still can never displace. Therefore, said cam surfaces may be exploited as if were in this application to serve as moving guides which continuously constrain any potential follower displacements in the X Y planes whilst the C-CAFA is in dynamical operation.

Examining said net applied lateral force component on the near cam, noting that, notwithstanding their ability to now rotate, said cams are still "static" as against displacements, we have:

$$F2 \sin \phi - F1 \sin \phi = (-F_a(w+2t/4t \cos \phi))\sin \phi - (-F_a (w/4t \cos \phi))\sin \phi = (\tfrac{1}{2})F_a.(\tan \phi).$$

Given the above, the near side of the follower experiences a net lateral reactive force of (½) $F_a$ (tan φ), acting on said follower and pointed upward in the Y direction. This means that the net lateral applied force acting on the near cam which is exerted by the near side of the follower landed in said near cam's groove is acting downward, on the cam, and in the negative Y direction, said force thereby urging the near cam clockwise. By symmetry, the far side of the follower experiences a net lateral reactive force of (½) $F_a$. (tan φ), acting on said follower and pointed downward in the negative Y direction. This means that the net lateral applied force acting on the far cam which is exerted by the far side of the follower landed in said far cam's groove is acting upward, on the cam, and in the positive Y direction, said force thereby urging the far cam counterclockwise.

The above noted two opposed, offset (along the Z axis), lateral forces acting on the follower create what is known as a couple, which couple is here referred to as the follower couple. A follower couple (e.g., a follower twist or moment) about its axis of reciprocation is a feature well noted in the art of two cam C-CAFA. This is because each counterrotating cam exerts an oppositely directed lateral reactive (or driving) force on each side of said apparatus' follower at all times in which a finite pressure angles exists.

Once the principal of the moving locus is understood, it may then be understood that (for a perfectly idealized and locus enveloped follower) any differential movement of the follower, dX in the X direction (i.e., along its axis of reciprocation), necessarily results in each cam (counter) rotating an angle dθ in exact accordance with the continuous displacement functions above detailed. In other words, the locus must necessarily move laterally while the cams counterrotate, and visa versa, in their predetermined functional relationship. Given the above, it is seen that for so long as the net applied force on the two cams acting in the direction of follower reciprocation is sufficient to overcome apparatus inertial and frictional resistance, the C-CAFA will have its cams synchronously counterrotate whilst the very same cams' cam surfaces force guide the follower in reciprocation by enveloping said follower perfectly within the three dimensional moving locus, whose sides (cam surfaces) cannot translate, rotation of the cams notwithstanding. It is further seen that forces F1-F4 are as a practical matter those which control the apparatus's ability to use its counterrotating cam surfaces as moving constraints in combination with the follower, said follower itself locked into the translating locus as a moving link between the cams. Any C-CAFA follower meeting the above detailed relaxed adequacy of constraint criteria will henceforth be referred to herein as "effectively adequately constrained".

Additional teaching lessons from the above are as follows.

First, should the distance "t" (which happens to be the width of the follower portion which slots into either of the exemplars' cams' grooves) be too small, extremely high forces can be generated on the follower and cams surfaces. See above force equations where "t" is in the denominator. In fact, it has already been demonstrated above that if "t" becomes zero, then the follower becomes unstable and statically indeterminate. The distance "t", generally, will represent the width of the contact between either side of a C-CAFA cam follower and its cooperating cam surface or surfaces.

Second, the force equations also demonstrate that the follower couple may be reduced to the extent that the dimension "w" is minimized.

Thirdly, the above analyses give guidance for situations in which some degree of CAFSI clearances at the F1-F4 interface points may be tolerated or even desirous, depending upon the particular C-CAFA application, structure, and or geometry. For example, a sliding cam follower may be employed with the C-CAFA embodiments disclosed herein. If so, the C-CAFA may be designed to use a lubricating film or layer at the CAFSI and thus employ finite CAFSI clearances which are to be more or less filled by said film or layer during the dynamic operation of the apparatus. This would simulate the "partial fixity" situation above mentioned, wherein some amount of follower displacement and or rotation would be necessary before it becomes constrained by cam surfaces. Notwithstanding this last statement, excessive CAFSI clearances would result in synchronously timed cam counterrotation being no longer ensured. But "excessive" in this light must be a relative term, because the optimum CAFSI clearance, if any, are a function of apparatus size, and should be determined by the actual testing of, and or experimentation with, a particular C-CAFA. For example, while a (arbitrarily selected) measured CAFSI clearance of 0.008 inches might be the maximum a certain small automotive engine utilizing a particular C-CAFA embodiment could tolerate and still ensure synchronous cam timing, depending on conditions, a C-CAFA based engine which powers an ocean going liner might possibly tolerate, say, 0.5 inch CAFSI clearance and yet remain synchronously timed, owing solely to said engine's tremendous size.

The potential for mistimed cams due to excessive CAFSI clearances is especially high where the counterrotating cams have low $\phi$ angles over a prolonged degree of cam counterrotation (e.g., as in dwell periods near top or bottom dead center positions). In situations where C-CAFA CAFSI clearances trend large, the POSITA may hedge against cam mis-synchronization by, for example and without limitation, reexamining the choice, if any, of lubricating film, and or may vertically offset said cams so as to create and or increase $\phi$ angles throughout the motion of the apparatus, and or by employing counterrotating cams whose profiles are of different harmonic orders, and or employing other synchronous cam timing techniques introduced and disclosed herein such as utilizing the cam and follower surface kinematics, and or by employing at least one electromagnetic cam system. Note that each and every above mentioned solution to the above OTP of ensuring synchronous timing of a C-CAFA's counterrotating cams is completely divorced physically and functionally from the prior art teachings and consequent solution to said OTP, namely, employing stationary geartrains, each of which possesses at least one gear with a stationary axis of rotation, which gear is a structural connection between, and is a separate structural element from, said cams. The reality of friction which exists for the (for the present discussion, rolling) follower when rolling on an actual cam surface must now be addressed. With friction present (noting also that no CAFSI clearances are present), the solid cylindrical follower of FIG. 8 cannot simultaneously roll (without slipping) on both sides of the cam surfaces (grooves) in one and or the other of the circular face cams making up the two cam C-CAFA. Therefore, this point must be taken into account in the structural design of the particular C-CAFA apparatus desired. Several of such structural design solutions to this potential dilemma are presented below, which address or pose alternative solutions thereto. These include the novel Multiple Degree Of Freedom (MDOF) cam introduced herein FIG. 38, which will enable a follower (which is even tightly interference fitted into said cam grooves) to freely roll simultaneously on both of said (inner and outer) cam grooves of each cam thereby keeping the follower effectively adequately constrained (and perfectly located within the moving locus) while the C-CAFA is in dynamic operation.

We next translate the above Adequacy of Constraint and Newtonian Force Analyses teachings into more general structural criteria which can be objectively verified for any C-CAFA, so that the engineer can accurately determine when he or she has constructed one of the apparatuses disclosed herein. While the above analyses used a so called "face cam" with grooves, and a follower with a circular cross-section, the results of the above analyses may be generalized to any of the C-CAFA embodiments disclosed herein, irrespective of the cam and or follower type.

First, any two cam C-CAFA follower determined to be effectively adequately constrained in accordance with the above analysis (including its several simplifying assumptions respecting F5 and F6, as above), will have necessarily met the structural condition (and Claim limitation herein) that at least one of its at least one cam followers will be always structurally in simultaneous and direct contact with at least one and the same particular cam surface of each of its two cams. This structural condition is necessary, but not always sufficient, for effective adequacy of constraint (i.e., formal adequacy of constraint as per Meriam Newtonian Definition, but relaxed due to our above simplifying assumptions respecting F5 and F6) of the follower to exist, and this fact was proven by our first (indeterminate) exemplar C-CAFA, which failed to constrain its follower within its moving locus, not because of finite CAFSI clearances, but, rather, due to defective CAFSI geometry (i.e., follower groove landing width in cam(s) was effectively too narrow). Moreover, even if the last mentioned (first sentence of this paragraph) structural condition is satisfied, the apparatus must still meet the functional limitation (and Claim limitation herein) that it is capable of synchronously timing cam counterrotation by and through at least one cam follower and at least one cam surface per cam, acting in combination. This last limitation could possibly not be met because, for example, an interference fit between a follower and cam surface(s) could be so tight that the mechanism literally jams, rather than functions as intended.

For an effectively adequately constrained follower in an at least three cam C-CAFA, said follower will have to at least meet the structural condition that at least one of its cam followers will be always structurally in simultaneous and direct contact with at least one and the same particular cam surface of each of its cams. See Claims herein. Again, this condition is necessary but not always sufficient to ensure effective adequacy of constraint of the follower, and the just stated functional limitation must also be met.

Identifying whether a C-CAFA having finite CAFSI clearances is of an ilk disclosed herein requires satisfying at least the following two limitations, one structural and one functional. Namely, said apparatus must possess (see Claims) at least one sufficiently small yet finite cam and follower surface interface clearance between each of its at least one cam followers and at least one of its at least one cam surfaces of at least one of its cams. Furthermore, said apparatus must be capable of (the Claim limitation of) synchronously timing cam counterrotation by and through at least one cam follower and at least one cam surface per cam, acting in combination. (see Claims). If the CAFSI clearances are not sufficiently small, then the apparatus will not be capable of synchronously timing cam counterrotation as such. Put differently, if this last functional (regarding synchronous cam timing) limitation is actually achieved in the presence of finite CAFSI clearances, then said clearances are necessarily sufficiently small within the meaning of this Application.

Lastly, regarding the adequacy of constraint analyses, in an (at least) three cam C-CAFA (assuming that finite CAFSI clearances were determined to exist in said apparatus), said C-CAFA (to be one of the embodiments disclosed herein) will have to at least meet the structural condition that at least one sufficiently small yet finite cam and follower surface interface clearance between each of its at least one cam followers and at least one of its at least one cam surfaces of at least one of said cams exists. Again, this last condition is necessary but not always sufficient to ensure effective adequacy of constraint of the follower, and, in any event, the above stated functional limitation (regarding synchronous timing, see Claims) must also be met.

Kinematical Analysis Regarding Synchronized Timing of Counterrotating Cams A rotating and reciprocating cam follower kinematically linking in timed synchronized rotation the cams of a C-CAFA is here first introduced. Note that any gears so utilized do not have "stationary" axes of rotation as found in the prior art, because all of such gears here analyzed in this section have axes of rotation which reciprocate.

In FIGS. 14, 16, 17, 18, 19, 20, and 21, we have a two cam C-CAFA comprised of circular face cams with grooves. Note that the follower has two different outside diameters, and that the cams each rotate about a common shaft. Each cam has two cam surfaces, the inner and outer portions of that respective cam's groove. The near cam is keyed to the shaft (not shown) and the far cam may freely rotate on the shaft. We note the variables germane to this kinematical analysis. They are $R_{ni}$=radius of near cam to its inner cam surface.
$R_{fi}$=radius of far cam to its inner cam surface.
$r_n$=radius of follower which slots into groove on near cam.
$r_f$=radius of follower which slots into groove on far cam.
$R_{no}$=radius of near cam to its outer cam surface.
$R_{fo}$=radius of far cam to its outer cam surface.
$C_{ni}$=circumference of near cam at its inner cam surface.
$C_{nf}$=circumference of follower section which slots into groove on near cam.
$C_{ff}$=circumference of follower section which slots into groove on far cam.
$C_{fo}$=circumference of far cam at its outer cam surface.

The following geometrical relationships exist among the above variables:

$$[C_{nf}/C_{ni}]=[C_{ff}/C_{fo}]$$

$$[R_{fi}+r_f]=[R_{ni}+r_n]$$

$$R_{fo}=R_{fi}+2r_f$$

$$Rn_o=Rn_i+2ri$$

Note that the near cam rotates clockwise, and the far cam counterclockwise.

We wish to cause both cams of this C-CAFA to be structurally and positively kinematically linked in timed synchronous counterrotation, through the rotational action of their cam surfaces and the follower, in combination.

Structurally, this means that this two cam C-CAFA must have at least one of its cam followers rotably connected with at least one of the cam surfaces of a first cam and with at least one of the cam surfaces of a second, counterrotating, cam. See Claims. Functionally, the apparatus must be capable of synchronously timing cam counterrotation by and through at least one cam follower and at least one cam surface per cam, acting in combination. See Claims.

To accomplish said synchronization, we note that the follower (rotationally linking both cams) must turn the same amount of revolutions per complete cam rotation cycle for each cam. Thus, the cams and followers must be designed so that each respective side of the follower (where it slots into the cam grooves of the respective cam) is properly proportioned (diameter wise). We may do this by imposing the condition that the ratio of the circumference of the follower (near side) to the near cam inner cam surface circumference must equal the ratio of the circumference of the follower (far side) to the far cam outer cam surface circumference. We note that these last two (near inner and far outer) cam surfaces counterrotate relative to each other because, in this particular example, they are rigidly fixed to the cam bodies themselves. Note that the outer cam surface of the near cam, and the inner surface of the far cam, are both here designated as "MDOF" surfaces, which may freely spin relative to the cam body. See generally the MDOF Discussion herein in "Best Mode and Detailed Description".

Given the above disclosed relationships and requirements, for this example, we arbitrarily select:
$R_{ni}$=100 (units of linear measurement), and $r_n$=20.

We then solve the above equations, with the result being:
$r_f$=30
$R_{fo}$=150
$R_{fi}$=90
$R_{no}$=140.

Figure 22:
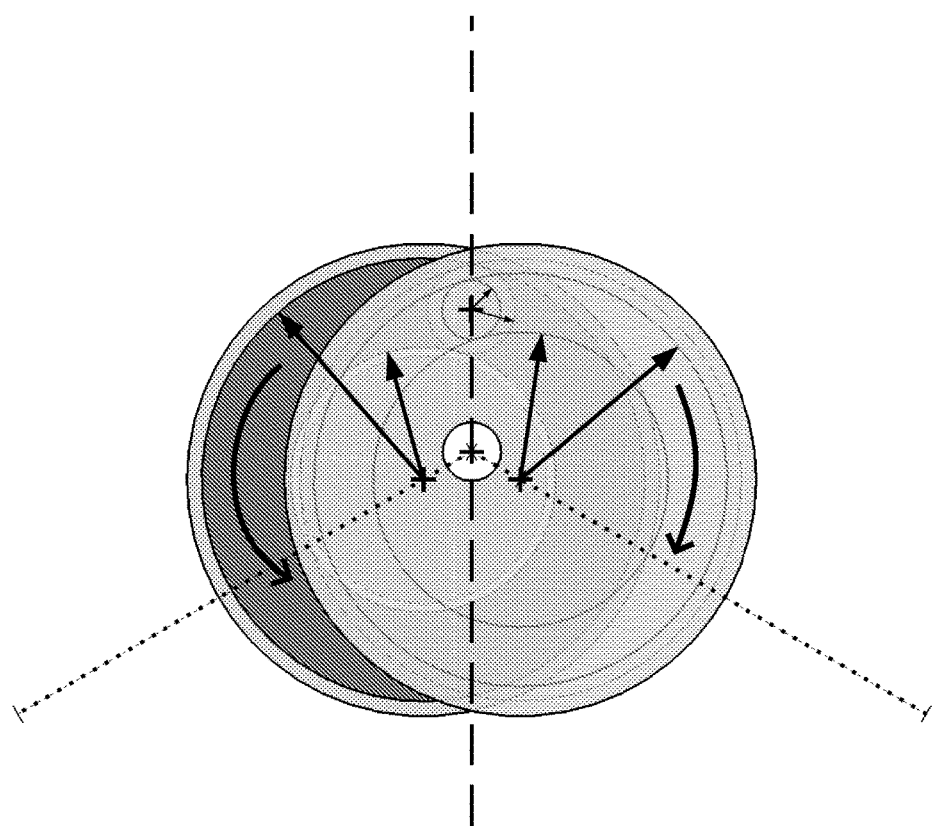
FIG. 22 shows exploded view of groove cam employing rotating and reciprocating follower
FIG. 23 close up, partial view of differential follower
FIG. 24 exploded partial view of differential follower
FIG. 25 exploded view of entire differential follower
FIG. 26 differential follower mounted on C-CAFA

FIG. 22, shows these exact proportions for the C-CAFA in question. With these cam surface and follower radii used to construct the cams and follower, the counterrotation of these cams will be synchronously timed. Gear surfaces shown may well aid definite rotable connections between the rotating follower and cam surfaces, but other, even smooth, surfaces may be employed provided that sufficient friction exists.

Another example of how a rotating and reciprocating cam follower may be utilized to rotably kinematically link and synchronously time counterrotating cams of a C-CAFA is shown in FIG. 23. FIGS. 23, 24, 25, and 26 disclose a "differential follower" which is designed to have its (gear as shown here) ends precisely counterrotate at the same angular speed, provided that the race, 73 does not rotate. It is designed to be used in a C-CAFA, where each of said follower's pinion gear sides (which rotably connect with the respective cams's cam surfaces) counterrotate, but at the same speed. Thus, said follower when appropriately placed in a C-CAFA will cause the cams to synchronously counterrotate. As is discussed in detail in "Best Mode and Detailed Description" relative to this differential follower, it is seen in FIG. 26 that a lip cam is employed. Said lip is of the constant (alone the reciprocation axis) diameter type discussed elsewhere in this application. Such a lip can prevent any pinion gear race wobble during operation (see "Best Mode and Detailed Description" discussing FIGS. 61-68 (anti-wobble cams)). This will allow the follower inner and outer rollers to be assembled tight, and, therefore, the race, 73, holding the several pinion gears, 55, will not rotate. The outer cam surfaces of both cams will have the same radius, and the cams will be mounted along a common axis of rotation.

Magnetized Cam Analysis

Lastly, the timed synchronization of the counterrotating cams may be achieved by using magnetized cams. FIGS. 27, 28, 29 show a C-CAFA with magnetized cams and stationary coils. Wiring is not shown. Current may be supplied as needed to either cam's coil to alter rotational speed so as to assist in synchronizing their timing as the situation warrants. Alternatively, either cam can be run in generator mode to achieve the same purpose of bringing them into counter-rotational harmony. Suitable timing marks (not shown) or crank position sensors (not shown) are placed on the cams for reference so that the cams' relative counter-rotational rotational positions may be monitored. Please refer to "Best Mode and Detailed Description" for more detail regarding synchronizing the timing of cams through electromagnetic force.

Best Mode and Detailed Description

FIGS. 1, 2, 3, 4, 5, 6, and 7 together depict a two cam C-CAFA. Cam, 1, is the rear face cam, and cam, 9, is the front eccentric face cam. FIG. 1. An optional piston, 5, and an optional connecting rod, 3, are shown. FIG. 1. A cylindrical cam follower, 7, is shown in FIG. 2. The groove, 23, in the rear face cam, 1, is shown in FIG. 1. The groove, 23, in the front face cam is not shown, except in hidden line form as viewed from the rear of cam, 9, in FIGS. 3, 4, 5, and 6. Shaft, 15, shaft moorings, 17, and shaft mooring interface, 13 are shown in FIG. 1. A shaft hole, 21, is shown in FIG. 7. The lip, 25, of the rear face cam is shown in FIGS. 1 and 7. Outer surface, 29, of face cam shown in FIG. 7. Center, 27, of rear face cam, 1, shown in FIG. 7. In this particular embodiment, front cam, 9, is keyed to shaft, 15, for rotation therewith, key not shown. FIG. 1. FIG. 1 also shows direction of shaft rotation and front cam rotation to be the same. Rear cam, 1, rotates freely on shaft, 15, with said shaft going through the rear cam's shaft hole, 21. Shaft, 15, is shown as continuous along its complete length. Suitable bearings, not shown, and suitable bosses, not shown, may optionally be installed along the length of the shaft at appropriate places to reduce friction or prevent cams from moving laterally along the shaft, respectively. Suitable bearings may also optionally be installed where the big end of connecting rod, 3, attaches to cylindrical cam follower, 7. The two cams are shown rotating in opposite directions. FIGS. 3, 4, 5, and 6, show apparatus counterrotating cam positions of top dead center (TDC), 90 degrees, 180 degrees, and 270 degrees from TDC, respectively.

On the scale of the drawings submitted in this application, and without resorting to a greatly distorted scaling scheme, it will not be possible for the viewer to definitively determine whether cam and follower surface interface (CAFSI) clearances exist, versus whether sufficiently small yet finite CAFSI clearances exist on any particular C-CAFA embodiment. Therefore, the existence or not of finite CAFSI clearances in these FIGURES will be stipulated herein. In this way, each of the several C-CAFA embodiments described herein may doubly serve to describe apparatuses both with and without finite CAFSI clearances, as follows.

In the first scenario of FIG. 1 we therefore stipulate that cam follower, 7, is fitted into cam grooves, 23, without CAFSI clearances between the outer circumference of follower, 7, and the inner and outer cam surfaces of said groove, 23. This scenario would include a so called "interference fit" whereby the follower is tightly fitted into the cam grooves of both cams. In such case, the structural condition that said cam follower is always structurally in simultaneous and direct contact with at least one and the same particular cam surface of each cam would exist. The second scenario of FIG. 1 is one wherein we stipulate that cam follower, 7, is loosely fitted into cam grooves, 23, meaning that finite CAFSI clearances there exist. Thus, the structural condition that at least one sufficiently small yet finite cam and follower surface interface clearance between said cam follower and at least one cam surface of at least one cam is met, provided that said apparatus is capable of synchronously timing cam counterrotation by and through at least one cam follower and at least one cam surface per cam, acting in combination. Put differently, if such finite CAFSI clearances structurally exist, and the last said functional condition is also met, then such CAFSI clearances are necessarily "sufficiently small" as claimed in the above referenced structural condition. In both of the alternative structural scenarios just described in the referenced embodiment, the structural condition that one and only one of the cams is rotably connected to a rotable output drive shaft is met.

In either alternative structural condition scenario just described (i.e., tight or loose fitting followers), the functional limitation that said apparatus is capable of synchronously timing cam counterrotation by and through at least one cam follower and at least one cam surface per cam, acting in combination, must be also met. In the cam follower scenario fitted without CAFSI clearances, the engineer should endeavor to not make the fit so tight as to impede successful attainment of such just mentioned functional condition. In the loose fitting cam follower scenario, the engineer should endeavor to not create such a degree of looseness which might cause misalignment of the follower in the cam grooves, and or cause mis-synchronized timing of the counterrotating cams themselves. The particular care just noted that the engineer should endeavor to achieve in terms of sizing the follower vis a vis the apparatuses' counterrotating cams is to be exercised in all scenarios described herein wherein either of the just mentioned alternative structural conditions are sought to be achieved. In certain scenarios, testing of the apparatus may be useful to so determine the optimum working fit between said follower and cam surfaces. The foregoing discussion applies not only to the making and using of the (grooved) face cams (just) described, but also the lip cams, eccentric strap cams, ring cams, and constant diameter cams, disclosed herein, and their equivalents.

Note: for every apparatus embodiment disclosed herein, any follower equivalent to those disclosed may be used. For example, in the above case, if the cam grooves faced outwards, two cylindrical follower halfs with a follower yoke portion could be used. Equivalence of said alternative followers is determined by whether they also meet the same limitations imposed upon the followers disclosed (as above) throughout this application.

Next, in the event that friction exists, or is assumed to exist, at the CAFSI points and or lines of contact between a cam follower of circular cross section and its corresponding cam groove surface(s), then how said follower is enabled to simultaneously roll on both opposite sides of any particular cam groove is address below.

In FIGS. 38, 39, 40, 41, 42, 43, and 44, a C-CAFA similar to the one just reviewed is shown. Several Multiple Degree of Freedom (MDOF) cams are here substituted for the conventional (i.e., one degree of freedom) face cams of the prior embodiment. Focusing on FIG. 39, the components of the particular MDOF cam shown are seen. They consist of the MDOF inner raceway, 147, the MDOF outer raceway, 145, and raceway balls, 143. The inner MDOF raceway, 147, mounts upon the inner circular eccentric portion, 141, of the rear MDOF cam, 135. The MDOF outer raceway, 145, mounts onto the outer cam surface of the cam, and such MDOF surface so mounted is shown in FIG. 38. The internal MDOF cam surface, 131, and the external MDOF cam surface, 133, are shown in FIG. 38. It is seen here that these particular raceways all have a cam surface portion (facing inward towards the cam follower) upon which the cylindrical cam follower for MDOF cam, 139, may ride. This particular embodiment has four MDOF surfaces installed, namely, the inner and outer groove cam surfaces of each cam. Another dissected view of the MDOF surfaces is shown again in FIG. 44. In FIG. 39, the directions of rotation of the MDOF surfaces and cylindrical cam follower vis a vis the cam body rotation itself are all shown. It is immediately seen therefore how said cylindrical cam follower for MDOF cam may simultaneously roll on both cam surfaces of either (inner and outer) cam groove of a particular cam. As in the previous embodiment, this embodiment may be constructed with an interference fitting cam follower or with finite CAFSI clearances. The same principals of apparatus construction and testing, and the same structural and functional conditions alternatively imposed, as discussed in the prior embodiment, apply equally to this embodiment. Some reflection on the part of the engineer is useful to determine on which cam surfaces such MDOF surfaces must be installed. In some cases, not all of the camming surfaces need MDOF surfaces fitted to them to ensure that the cam follower rolls without slipping. The MDOF surfaces/raceways may be fitted by any conventional means to the cams, including press fit or temperature fit, and bosses or equivalent structure may be used to otherwise keep said MDOF surfaces/raceways in place on the cam.

In FIGS. 14, 15, 16, 17, 18, 19, 20, and 21, a two cam, face cam C-CAFA embodiment is shown, which is representative of the example C-CAFA which was used in the kinematical analysis herein teaching synchronized timing of counterrotating cams. These FIGS. thus constitute a C-CAFA employing a rotating and reciprocating cam follower which positively kinematically ensures timed synchronized rotation the cams of a C-CAFA.

We begin describing this embodiment by examining the rotating and reciprocating follower, 38. FIGS. 16, 21. In this particular case, said follower is rigid, and has two different diameters, 37, and 39, whose diametrical surfaces each employ gear teeth. FIGS. 15, 16. All cam surfaces in this embodiment are seen to utilize gear teeth. The two MDOF cam surfaces possessing gear teeth are shown at 44 and 46. FIG. 21. MDOF surface, 46, FIG. 21, is the outer cam surface of the front face cam, 41, of this rotating and reciprocating follower type C-CAFA. MDOF surface 44, FIG. 21, is the inner cam surface of the rear face cam, 42, of said C-CAFA. Cam surfaces fixed to said cam bodies which necessarily rotate therewith are shown at 50 (front cam, inner surface) and at 48 (rear cam, outer surface). FIG. 21. An optional piston, 5, and an optional connecting rod, 3, are shown. FIG. 14. A cylindrical cam follower, 7, is shown in FIG. 2. As in the previous embodiments, shaft, 15, shaft moorings, 17, and shaft mooring interface, 13 are shown in FIG. 14. A shaft hole, 21, is shown in FIG. 21. In this particular embodiment, said front cam, 41, is keyed to shaft, 15, for rotation therewith (key not shown). FIG. 14. FIG. 14 also shows direction of shaft rotation and front cam rotation to be the same. Said rear face cam, 42, rotates freely on shaft, 15, with said shaft going through said rear cam's shaft hole, 21. Suitable bearings, not shown, and suitable bosses, not shown, may optionally be installed along the length of the shaft at appropriate places to reduce friction or prevent cams from moving laterally along the shaft, respectively. Suitable bearings may also optionally be installed where the big end of the optional connecting rod, 3, attaches to cylindrical cam follower, 38. The two cams are shown rotating in opposite directions, FIG. 14, and are further shown once again at their TDC, 90, 180, and 270 degree counter-rotational positions in FIGS. 17, 18, 19, and 20, respectively.

This embodiment is not limited to the use as above of gear surfaces for camming surfaces. Any surface which has sufficient friction as to ensure pure rolling contact between the cam follower and cam surface will suffice to cause cam synchronization in accordance with the Kinematical Analysis Regarding Synchronized Timing of Counterrotating Cams previously detailed. By this last statement, Applicant does not in any way characterize the action of gear teeth meshing as either "rolling" or "sliding", as some debate in the engineering community exists on this point and no position is taken on said point herein. Once again, the appropriate sizing of the cams and follower diameters for this embodiment may be determined in accordance with said Kinematical Analysis Regarding Synchronized Timing of Counterrotating Cams. As to the structural and functional conditions met by this C-CAFA embodiment, we have as follows. Structurally, said apparatus has at least one cam follower rotably connected with at least one cam surface of a first cam and with at least one cam surface of a second, counterrotating, cam. Functionally, said apparatus as styled is capable of synchronously timing cam counterrotation by and through at least one cam follower and at least one cam surface per cam, acting in combination. Also, the structural limitation in this embodiment that one and only one of said cams is rotably connected to at least one rotable output drive shaft is met. Lastly, for reader convenience and further guidance, FIG. 22 pertains to the C-CAFA just detailed, and all cam surface and follower surface diameters there shown are in the exact ratio and proportion as the (first) example embodiment which was discussed in the Kinematical Analysis Regarding Synchronized Timing of Counterrotating Cams.

In FIGS. 77, 78, 79, 80, 81, and 82, a two cam, offset shaft, C-CAFA is shown. Cam, 201, is the rear face cam, and cam, 203, is the front face cam. FIG. 77. An optional piston, 5, and an optional connecting rod, 3, are shown. FIG. 77. A cylindrical cam follower for this offset shaft C-CAFA, 195, is shown in FIG. 78. The groove trough, 197, in the rear face cam, 201, and the groove trough, 200 (shown by hidden lines) in the front face cam, 203, are shown in FIGS. 79, 80. Lower shaft, 193, and upper shaft, 191, are shown as counterrotating in this embodiment, with both cams keyed (not shown) to their respective shafts. Shaft mooring interface, 13, is shown in FIG. 77. Suitable bearings, not shown, and suitable bosses, not shown, may optionally be installed along either shaft at appropriate places to reduce friction or prevent cams from moving laterally along the shafts. Suitable bearings may also optionally be installed where the big end of connecting rod, 3, attaches to cylindrical cam follower, 195. FIG. 78. FIGS. 79, 80, 81, and 82 show apparatus counterrotating cam positions of top dead center (TDC), 90 degrees, 180 degrees, and 270 degrees from TDC, respectively. Note that in this embodiment TDC position of the follower is shown horizontally to the right. The geometry of this offset shaft arrangement using (as in this example)

circular cam surfaces is shown in detail in FIG. 13, and is thoroughly discussed in the Adequacy of Constraint Analysis herein.

In the first offset shaft C-CAFA embodiment scenario of FIG. 77, we stipulate that cam follower, 195, is fitted into cam grooves, 197, 200, without CAFSI clearances. MDOF cam surfaces may be fitted as appropriate in this example at the option of the engineer. This presently analyzed scenario sans CAFSI clearances would include a so called "interference fit", whereby the follower is tightly fitted into the cam grooves of both cams. In this case of no CAFSI clearances, the structural condition that said cam follower is always structurally in simultaneous and direct contact with at least one and the same particular cam surface of each cam is met. The functional condition that said apparatus is capable of synchronously timing cam counterrotation by and through at least one cam follower and at least one cam surface per cam, acting in combination, must also be met. Once again, the engineer should endeavor to construct such scenario such that excessively tight fitting follower(s) do not impede apparatus operation.

In the second scenario of FIG. 77, we stipulate that cam follower, 195, is now loosely fitted into cam grooves, 197 and 200, meaning that finite CAFSI clearances now there exist. Thus, the structural condition that at least one sufficiently small yet finite cam and follower surface interface clearance between said cam follower and at least one cam surface of at least one cam is met, provided that said apparatus is capable of synchronously timing cam counterrotation by and through at least one cam follower and at least one cam surface per cam, acting in combination. Put differently, once again if such finite CAFSI clearances so exist, and the last said functional condition is nonetheless met, then such CAFSI clearances are necessarily "sufficiently small" as claimed herein. Here again, the engineer should endeavor to not construct such looseness between the follower and its cam surfaces that impede the proper operation of the apparatus, especially in terms of the just mentioned functional condition. The additional structural condition that each of said cams is rotably connected to at least one rotable output drive shaft is met in the above configuration. Optionally, either shaft may be truncated so that it does not protrude from the outside of its shaft mooring, 17, with the remaining shaft thereby left to transmit all rotational power in only one rotational direction. In such case, the condition that one and only one of said cams is rotably connected to a rotable output drive shaft would be met.

In FIGS. 90, 91, 93, 94, 95, 96, and 97, a "boxer" arrangement of face cams for a two cam C-CAFA is shown. In this case, sliding cam followers are employed, and the optional pistons, 5, are 180 degrees out of phase. Cam, 212, is the rear face cam, and cam, 213, is the front face cam. FIG. 90. An optional piston, 5, and an optional connecting rod, 3, are shown. FIG. 91, 92. A sliding cam follower, 208, is shown in FIGS. 91, 92, and 97. Said follower fits onto pin, 210, which pin slots through hole in the bottom of the optional connecting rod, 3. The cam grooves, 214, are shown in FIGS. 93, 94, 95, 96, and 97. Shaft, 15, shaft moorings, 17, and shaft mooring interface, 13 are shown in FIG. 90. A shaft hole, 216, is shown in FIG. 97. In this particular embodiment, front cam, 213, is keyed to shaft, 15, for rotation therewith, key not shown. FIG. 90. FIG. 90 also shows direction of shaft rotation and front cam rotation to be the same. Rear cam, 212, rotates freely on shaft, 15, with said shaft going through the rear cam's shaft hole, 216. Shaft, 15, is shown as continuous along its complete length. Suitable bearings, not shown, and suitable bosses, not shown, may optionally be installed along the length of the shaft at appropriate places to reduce friction or prevent cams from moving laterally along the shaft, respectively. The two cams are shown rotating in opposite directions. FIGS. 93, 94, 95, and 96 show apparatus counterrotating cam positions of top dead center (TDC), 90 degrees, 180 degrees, and 270 degrees from TDC, respectively. Top Dead Center with this apparatus, FIG. 93, is seen to have both of the followers at their maximum extension (here shown horizontally) from their common center of rotation, 15. Cam grooves, 214, are shown throughout FIGS. 93, 94, 95, 96, and 97. In the first scenario of FIG. 90 we stipulate that cam follower, 208, is fitted into the respective cam grooves, 214, without CAFSI clearances. This scenario would include a so called "interference fit" whereby the follower is tightly fitted into the cam grooves of both cams. Moreover, said embodiments grooves and sliding followers may be of frictionless materials so allowing such a fit to function. In the case just discussed, the structural condition that said cam follower is always structurally in simultaneous and direct contact with at least one and the same particular cam surface of each cam would exist. The second scenario of FIG. 90 is one wherein we stipulate that cam follower, 208, is loosely fitted into cam grooves, 214, meaning that finite CAFSI clearances there exist. Thus, the structural condition that at least one sufficiently small yet finite cam and follower surface interface clearance between said cam follower and at least one cam surface of at least one cam is met, provided that said apparatus is capable of synchronously timing cam counterrotation by and through at least one cam follower and at least one cam surface per cam, acting in combination. Put differently, if such finite CAFSI clearances structurally exist, and the last said functional condition is also met, then such CAFSI clearances are necessarily "sufficiently small" as claimed in the above referenced structural condition. In both of the alternative structural scenarios just described in the referenced embodiment, the structural condition in this boxer embodiment that one and only one of the cams is rotably connected to a rotable output drive shaft is met.

In either alternative structural condition scenario just described (i.e., tight or loose fitting followers), the functional limitation that said apparatus is capable of synchronously timing cam counterrotation by and through at least one cam follower and at least one cam surface per cam, acting in combination, must be also met. In the cam follower scenario fitted without CAFSI clearances, the engineer should endeavor to not make the fit so tight as to impede successful attainment of such just mentioned functional condition. In the loose fitting cam follower scenario, the engineer should endeavor to not create such a degree of looseness which might cause misalignment of the follower in the cam grooves, and or cause mis-synchronized timing of the counterrotating cams themselves. The particular care just noted that the engineer should endeavor to achieve in terms of sizing the follower vis a vis the apparatuses' counterrotating cams is to be exercised in all scenarios described herein wherein either of the just mentioned alternative structural conditions are sought to be achieved. In certain scenarios, testing of the apparatus may be useful to so determine the optimum working fit between said follower and cam surfaces. The foregoing discussion applies not only to the making and using of the (grooved) face cams (just) described, but also the lip cams, eccentric strap cams, ring cams, and constant diameter cams, disclosed herein, and their equivalents.

FIGS. 27, 28, and 29, show a two cam C-CAFA embodiment of the electromechanical type (hereinafter designated as EM C-CAFA), which ensures synchronized timing of its counterrotating cams by and through the transmission of electromagnetic force between at least one magnetized cam and at least one coil. This embodiment (for convenience) employs the same "boxer" arrangement of face cams as was shown in the last described embodiment. Thus, sliding cam followers are again employed (see last embodiment), and the optional pistons, 5, are again 180 degrees out of phase. Cam, 98, is the rear face cam, and cam, 97, is the front face cam. FIG. 27. An optional piston, 5, and an optional connecting rod, 3, are shown. FIGS. 27, 29. The sliding cam follower, 208, and rod, 3, are shown in FIGS. 91, 92, and 93. Said follower fits onto pin, 210, which pin slots through hole in the bottom of the optional connecting rod, 3. FIG. 91, 92. The cam grooves, 105, are shown in FIG. 29. Shaft, 15, is moored to apparatus at the front and rear housings, 91 and 101, respectively. In this particular embodiment, front cam, 97, is keyed to shaft, 15, for rotation therewith, key not shown. FIG. 27. In FIG. 27, the direction of shaft rotation and front cam rotation are the same. Rear cam, 98, rotates freely on shaft, 15, in the opposite direction. Shaft, 15, is shown as continuous along its complete length. Suitable bearings, not shown, and suitable bosses, not shown, may optionally be installed along the length of the shaft at appropriate places to reduce friction or prevent cams from moving laterally along the shaft, respectively. Top Dead Center with this apparatus and the sequential movement of the cams is the same as the last embodiment. See FIGS. 93, 94, 95, 96. A coil section is installed within either or both housing sections in the general proximity of 94. FIG. 28. Cams have outer magnetized sections shown as 99, and inner sections, 100. FIG. 28. Said magnetized portions may be of permanent magnets, or of any material which has been magnetized, or may consist of electromagnets, provided that proper equipment for charging same with current are provided, such as slip rings (not shown). Cam position sensors (not shown), and a controller for receiving the signals from said sensors, and which controller then, in response to said signals, regulates the transmission of an appropriate electromagnetic force between at least one magnetized cam and at least one coil, may be included (not shown). The above configured EM C-CAFA must meet (at least) the following conditions, namely, that it has at least one magnetized cam and at least one coil capable of conducting electric current cooperating therewith, whereby said apparatus is capable of synchronously timing cam counterrotation by and through the transmission of electromagnetic force between said at least one magnetized cam and said at least one coil. At least two other potential power take off structures may be obtained with this embodiment. If the output drive shaft is physically effectively split between the cams, and each shafts then keyed to a cam, then the structural limitation that at least one cam rotably connected to a first rotable output drive shaft and at least one other of said cams rotably connected to at least one other rotable output drive shaft structured and arranged to rotate in the direction opposite to said first shaft, will be met. Alternatively, should this EM C-CAFA embodiment have no physical power output shaft(s) at all, and, instead, relies on the transmission of electrical power for its power transmission, then said apparatus will possess at least one electrical input output receptacle for the purpose of supplying power to, or removing power from, said apparatus.

FIGS. 30, 31, 32, 33, 34, 35, 36, and 37, together depict a two cam "lip cam" C-CAFA which has balance holes in its cams. Cam, 129, is the rear lip cam, and cam, 119, is the front lip cam. FIGS. 30, 34, and 36. An optional piston, 5, and an optional connecting rod, 3, are shown. FIG. 30. The cam follower in this instance is a composite follower which is constructed of several components. These components include follower shaft, 109, follower stirrup, 111, follower stirrup, lower end, 125, follower roller mount, 69, and lower follower roller, 63. FIGS. 30, 31, 32, 37. The interface between follower stirrup and follower shaft is marked as 123. FIG. 31. An adjustable structural element, such as a turnbuckle (not shown), may be placed at the interface between follower stirrup, 111, and follower stirrup, lower end, 125. Said turnbuckle may be used to adjust the amount of CAFSI clearance, if any, between: (1) follower shaft, 109, and outer cam outer surface, 64, FIG. 37, and (2) lower follower roller, 63, and inner lip cam surface, 130. Such CAFSI clearances may also be adjusted or eliminated by using different sized lower follower rollers, 63, and or different sized follower shafts, 109. The lip itself of the lip cam shown as 121. FIGS. 30, 37. Shaft, 15, shaft moorings, 17, and shaft mooring interface, 13 are shown in FIG. 30. In this particular embodiment, front lip cam, 119, is keyed to shaft, 15, for rotation therewith, key not shown. FIG. 30. FIG. 30 also shows direction of shaft rotation and front lip cam rotation to be the same. Rear lip cam, 129, rotates freely on shaft, 15. Shaft, 15, is shown as continuous along its complete length. Suitable bearings, not shown, and suitable bosses, not shown, may optionally be installed along the length of the shaft at appropriate places to reduce friction or prevent cams from moving laterally along the shaft, respectively. Suitable bearings may also optionally be installed where the big end of connecting rod, 3, attaches to follower shaft, 109. FIGS. 33, 34, 35, and 36 show apparatus counterrotating cam positions of top dead center (TDC), 90 degrees, 180 degrees, and 270 degrees from TDC, respectively.

In the first scenario of FIG. 30 we stipulate that no CAFSI clearances exist between: (1) follower shaft, 109, and outer cam outer surface, 64, FIG. 37, nor between (2) lower follower roller, 63, and inner lip cam surface, 130. This scenario would include a so called "interference fit" whereby the follower is tightly fitted to the surfaces of both cams. In this present case, the structural condition that said cam follower is always structurally in simultaneous and direct contact with at least one and the same particular cam surface of each cam exists. The second scenario of FIG. 30 to examine is one wherein we stipulate finite CAFSI interface clearances existing between (1) follower shaft, 109, and outer cam outer surface, 64, FIG. 37, and or between (2) lower follower roller, 63, and inner lip cam surface, 130. If this is the case, then the structural condition that at least one sufficiently small yet finite cam and follower surface interface clearance between said cam follower and at least one cam surface of at least one cam is met, provided that said apparatus is capable of synchronously timing cam counterrotation by and through at least one cam follower and at least one cam surface per cam, acting in combination. Put differently, if such finite CAFSI clearances structurally exist, and the last said functional condition is also met, then such CAFSI clearances are necessarily "sufficiently small" as claimed in the above referenced structural condition. In both of the alternative structural scenarios just described in the referenced embodiment, the structural condition that one and only one of the cams is rotably connected to a rotable output drive shaft is met. In either alternative structural condition scenario just described, the functional limitation that said apparatus is capable of synchronously timing cam counterrotation by and through at least one cam follower and at least one cam surface per cam, acting in combination, must be also met. In the cam follower scenario fitted without CAFSI clearances, the engineer should endeavor to not make the fit so tight as to impede successful attainment of such just mentioned functional condition. In the loose fitting cam follower scenario, the engineer should endeavor to not create such a degree of looseness which might cause misalignment of the follower relative to the cam lips causing mis-synchronized timing of the counterrotating cams themselves. The particular care just noted that the engineer should endeavor to achieve in terms of sizing the follower vis a vis the apparatuses' counterrotating cams is to be exercised in all scenarios described herein wherein either of the just mentioned alternative structural conditions are sought to be achieved. In certain scenarios, testing of the apparatus may be useful to so determine the optimum working fit between the follower(s) and cam surfaces. The foregoing discussion applies not only to the making and using of the lip cams (just) described, but also the groove cams, eccentric strap cams, ring cams, and constant diameter cams, disclosed herein, and their equivalents. Bearings may be mounted on the follower shaft, 109, on either or both sides of the rod end to facilitate rolling on the exterior cam outer profiles (surfaces) which are moving in opposite directions.

The anti-wobble lip cam, FIGS. 61, 63, 64, 65, 66, 67, and 68, is similar in construction to the just examined lip cam, with the following differences noted. The rear anti-wobble lip cam, 174, the front anti-wobble lip cam, 173, cam trough of anti-wobble lip cam, 175, with the following difference. Rather than the "lip", 121, FIG. 30, of said lip cam having a constant thickness as measured in the radial direction of the cam, said lip has a variable thickness, which variable thickness is actually constant when measured along the axis of reciprocation of the follower when the apparatus is properly aligned. In the lip cam just examined in FIG. 30, the effective thickness of the lip as measured along the axis of reciprocation changes during apparatus operation. The distance across said lip is equal to the (minimum, as measured radially) actual thickness of the lip only at TDC and BDC positions. Otherwise, because of the rotation of the cams, the distance across said lip measured along the axis of reciprocation becomes longer. This forces a tight fitting follower of the type shown in FIG. 30 to wobble during the operation of the apparatus, as it is forced to ride on the minimum thickness of the lip, causing its follower stirrup, 111, to pivot on the follower shaft, 109. By constructing the lip to have a constant thickness as measured along the axis of reciprocation for any apparatus position, see FIG. 68, at 177, then a tight follower may easily ride exactly along the axis of reciprocation without wobbling because the thickness of said lip as measured in that direction is constant. The utility of using such an anti-wobble lip cam includes: preventing said follower wobble, and, should the lip be sufficiently thick, now having two points of pure reciprocation to which to attach a rod end, thereby preventing the connecting rod from flapping during operation by effectively eliminating the rod hinge normally associated with the big end rod connection to the follower.

In all other respects, the analysis of the Anti-wobble lip cam is the same as the lip cam just examined. The actual wobble of the cam followers is not shown in any of the lip cam

FIGURES IN THIS APPLICATION

FIGS. 69, 72, 73, 74, 75, and 76, together depict a two cam, constant volume combustion (CVC), "lip cam" C-CAFA which has a cam contour which causes a substantial dwell of the optionally attached piston at TDC. Said long dwell is useful in attaining a so called "constant volume combustion" (CVC) scenario in an internal combustion engine. The cam profile shown approximates about a 30 degree dwell at TDC for this purpose. And while the several profile views of the CVC counterrotating cam motion sequence, FIGS. 72, 73, 74, and 75 may appear to have unmatched cam profiles, the opposite is true. Namely the said profiles are matched exactly. This is ensured by constructing, for example, two exact CVC type lip cams of the same cam profile and shaft hole placement, inverting one relative to the other (i.e., as in turning over a pie plate), then mounting them both on their shaft. This will cause their profiles to intersect exactly along the line of reciprocation of the apparatus follower center for all possible apparatus counter-rotational angles. This is what is occurring in said motion sequence because this is how the cams were constructed and so positioned on their shaft for this embodiment description.

Shown are the rear CVC cam, 187, and the front CVC cam, 185. FIGS. 69, 72, 73, 74, 75, and 76. The outer CVC cam surface is there shown as 183. An optional piston, 5, and an optional connecting rod, 3, are shown. FIG. 69. The cam follower in this instance is a composite follower which is constructed of several components. These components include follower shaft, 109, follower stirrup, 111, follower stirrup, lower end, 125, follower roller mount, 69, and lower follower roller, 63. FIGS. 70, 71. The interface between follower stirrup and follower shaft is marked as 123. FIG. 70. An adjustable structural element, such as a turnbuckle (not shown), may be placed at the interface between follower stirrup, 111, and follower stirrup, lower end, 125. Said turnbuckle may be used to adjust the amount of CAFSI clearance, if any, between: (1) follower shaft, 109, and outer CVC cam surface, 183, FIG. 76, and (2) lower follower roller, 63, and inner CVC cam surface, 182. Such CAFSI clearances may also be adjusted or eliminated by using different sized lower follower rollers, 63, and or different sized follower shafts, 109. Shaft, 15, shaft moorings, 17, and shaft hole, 21, are shown in FIGS. 69, 72, 73, 74, 75, and 76. In this particular embodiment, front CVC cam, 185, is keyed to shaft, 15, for rotation therewith, key not shown. 191. FIGS. 69 and 73 together show the direction of shaft rotation and front CVC cam rotation to be the same. Rear lip cam, 187, rotates freely on shaft, 15. Shaft, 15, is shown as continuous along its complete length. Suitable bearings, not shown, and suitable bosses, not shown, may optionally be installed along the length of the shaft at appropriate places to reduce friction or prevent cams from moving laterally along the shaft, respectively. Suitable bearings may also optionally be installed where the big end of connecting rod, 3, attaches to follower shaft, 109. FIG. 70. FIGS. 72, 73, 74, and 75 show apparatus counterrotating cam positions of top dead center (TDC), 90 degrees, 180 degrees, and 270 degrees from TDC, respectively, with TDC position shown horizontally. FIG. 72.

In the first scenario of FIG. 69 we stipulate that no CAFSI clearances exist. The analysis as to how to ensure the follower is tight was already detailed for the "lip cam" embodiment disclosed, and the reader is there referred for such details. Suffice it that the structural condition that said cam follower is always structurally in simultaneous and direct contact with at least one and the same particular cam surface of each cam will be satisfied in such situation. The second scenario of FIG. 69 to examine is one wherein we stipulate finite CAFSI interface clearances existing between (1) follower shaft, 109, and outer cam outer surface, 64, FIG. 37, and or between (2) lower follower roller, 63, and inner CVC cam surface, 102. If this is the case, then the structural condition that at least one sufficiently small yet finite cam and follower surface interface clearance between said cam follower and at least one cam surface of at least one cam is met, provided that said apparatus is capable of synchronously timing cam counterrotation by and through at least one cam follower and at least one cam surface per cam, acting in combination. Put differently, if such finite CAFSI clearances structurally exist, and the last said functional condition is also met, then such CAFSI clearances are necessarily "sufficiently small" as claimed in the above referenced structural condition. In both of the alternative structural scenarios just described in the referenced embodiment, the structural condition that one and only one of the cams is rotably connected to a rotable output drive shaft is met.

To reiterate, in either alternative structural condition scenario just described, the functional limitation that said apparatus is capable of synchronously timing cam counterrotation by and through at least one cam follower and at least one cam surface per cam, acting in combination, must be also met. In the cam follower scenario fitted without CAFSI clearances, the engineer should endeavor to not make the fit so tight as to impede successful attainment of such just mentioned functional condition. In the loose fitting cam follower scenario, the engineer should endeavor to not create such a degree of looseness which might cause misalignment of the follower relative to the cam lips causing mis-synchronized timing of the counterrotating cams themselves. The particular care just noted that the engineer should endeavor to achieve in terms of sizing the follower vis a vis the apparatuses' counterrotating cams is to be exercised in all scenarios described herein wherein either of the just mentioned alternative structural conditions are sought to be achieved. In certain scenarios, testing of the apparatus may be useful to so determine the optimum working fit between the follower(s) and cam surfaces. The foregoing discussion applies not only to the making and using of the CVC cams (just) described, but also the groove cams, eccentric strap cams, lip cams, ring cams, and constant diameter cams, disclosed herein, and their equivalents.

FIGS. 83, 84, 85, 86, 87, 88, and 89 depict a second harmonic order (SHO) lip cam C-CAFA. The same may be useful in combination with a piston engine when high torque outputs and or low speed operation are desired. This embodiment utilizes the same cam follower previously discussed for lip cam embodiments disclosed. The analysis in terms of the structural conditions respecting loose and tight fitting cam followers is the same as the several prior example embodiments, and will not be repeated. Elements new to this embodiment include rear SHO cam, 204, and front SHO cam, 206. This system is shown with one power shaft keyed to front SHO cam, 206, rotating clockwise, whilst the rear SHO cam is not keyed to said shaft, and rotates counterclockwise.

In FIGS. 23, 24, 25, and 26, a differential cam follower is shown. Said follower may be utilized for ensuring the timed synchronization of the counterrotation of C-CAFA cams. Said differential follower may be used in any of the previously detailed lip cam C-CAFA, and is further adaptable to some of the C-CAFA yet to be reviewed herein. In so adapting said differential follower for use in any of the just mentioned lip cam systems, said follower may ride on the exterior cam surfaces of said lip cams. Gear teeth, as shown in FIGS. 23, 24, 25, and 26 would ensure positive linking action between elements thus assisting cam synchronization. The components of said differential follower are as follows: outer roller of differential follower (shown with gear teeth on pinion mating surface), 53; pinions (shown with gear teeth), 55; hollow roller (shown with gear teeth), 57; spindle roller (shown with gear teeth), 59; finished end of spindle roller, 61; lower follower roller, 63; rear lip cam (shown with gear teeth), 64; stirrup end piece, non-pinion side, 65; front lip cam (shown with gear teeth), 66; stirrup end piece, pinion race end, 67; follower roller mount, 69; potential adjustment area, 71; raceway for pinions, 73; surface to engage pinions (shown with gear teeth), 77; stirrup, non-pinion side, bottom lobe, 79; and shaft, 15. Conventional bearings may optionally be positioned between spindle roller and rod, 3, big end.

The operation of the differential follower is to have spindle roller, 59, and hollow roller, 57, rotate at the same angular speed but in opposite directions while each are rotably connected to and or otherwise bearing upon the counterrotating lip cam outer surfaces. To accomplish this, the raceway for pinions, 73, must not rotate during apparatus operation. This may be accomplished by utilizing the anti-wobble type lip cams previously disclosed, whereby side to side wobble of the follower (pivoting about the spindle, when viewed in profile) is eliminated. In this embodiment, shaft 15 is keyed to front lip cam, causing both shaft and front lip cam to rotate in the same direction. Rear lip cam not keyed to shaft.

In FIGS. 98, 99, a two cam lip cam C-CAFA is disclosed which has power output shafts rotating in opposite directions. FIG. 99 show how the shafts are actually separate. Each shaft is keyed to its respective (counterrotating) cam (keys not shown). All of the prior two cam embodiments disclosed which had the condition of having one and only one of its cams rotably connected to at least one rotable output drive shaft may be constructed differently should dual, counterrotating power output be desired. Should such counterrotating power output be desired, then those just mentioned embodiment types which have been disclosed herein could be constructed or reconstructed to possess the dual counterrotating output shown in FIG. 99. If so constructed or reconstructed, such an apparatus would satisfy the condition that each of its cams are rotably connected to at least one rotable output drive shaft. FIGS. 100, 101, and 102, show a three cam C-CAFA, in which the outer face cams, 220, both rotate in the same direction, and the inner cam, 224, rotates in the other direction. In this embodiment, the outer cams are keyed (not shown) to the output drive shaft, 15. Interior cam, 224, is not keyed to said shaft.

All of the prior two and only two cam C-CAFA embodiment types disclosed herein may be constructed differently should a three cam C-CAFA be desired. For example, the face cam example embodiment type of FIG. 1 could add a plate cam, 224, to its center. Said plate cam could have its outer cam surface, 222, matching the inner face cam surface, 221, of cam(s) 220. The cylindrical follower element, 225, could be used, with a yoke type follower element, 223, adopted to affix the optional rod, 3, bottom to said cylindrical follower element. Bearings along said cylindrical element and MDOF cam surfaces, may be employed as needed or desired for the particular application. Moreover, should the follower be fitted at the CAFSI without clearances in accordance with the teachings herein, then the condition that at least one of said at least one cam followers being always structurally in simultaneous and direct contact with at least one and the same particular cam surface of each of said cams could be attained. Alternatively, should the engineer desire loose fitting followers at the CAFSI, then the condition that at least one sufficiently small yet finite CAFSI clearance between each of its cam followers and at least one cam surface of at least one of its cams could be attained in accordance with the teachings herein.

Figure 103:
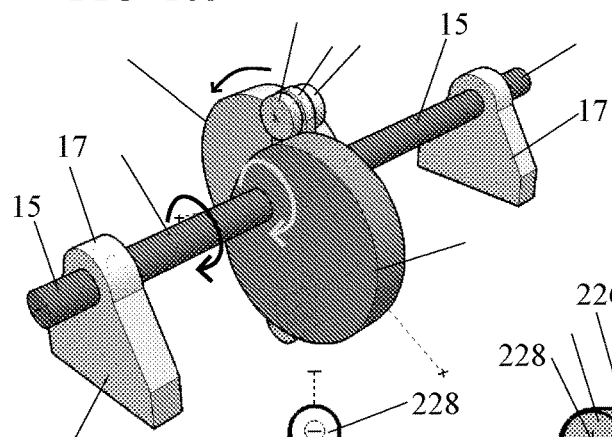
FIG. 103 constant diameter two cam C-CAFA
FIG. 104 follower for constant diameter cam
FIG. 105 follower for constant diameter cam, profile
FIG. 106, 107, 108, 109 motion sequence of constant diameter cam
FIG. 110 exploded view constant diameter cam and follower Adequacy of Constraint and Newtonian Force Analysis, Cam and Follower Surface Kinematical Analysis, and Magnetized Cam Analysis, all in respect of making and using those synchronously timed counterrotating cam and follower apparatuses (C-CAFA) disclosed herein and their equivalents.
Figure 104:
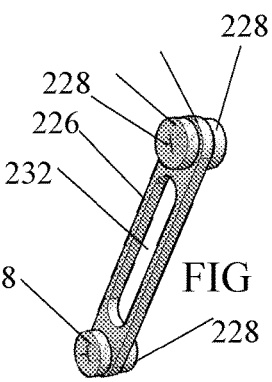
Figure 105:
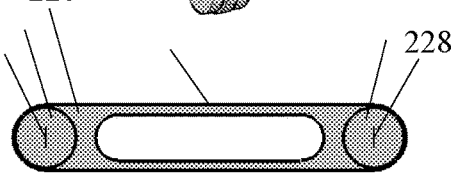
Figure 106:
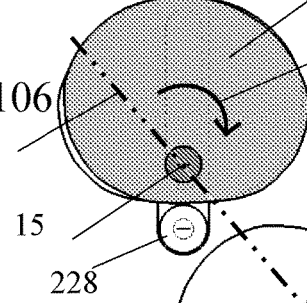
Figure 107:
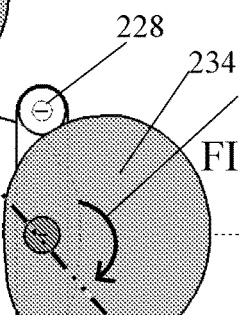
Figure 110:
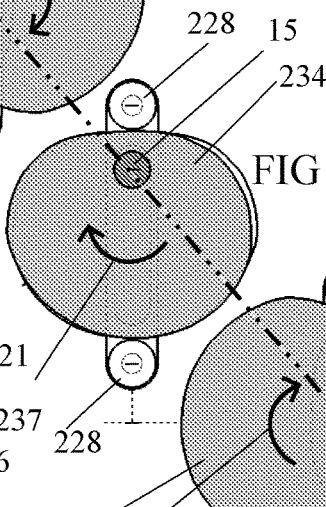
Figure 108:
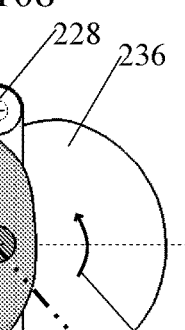
Figure 109:
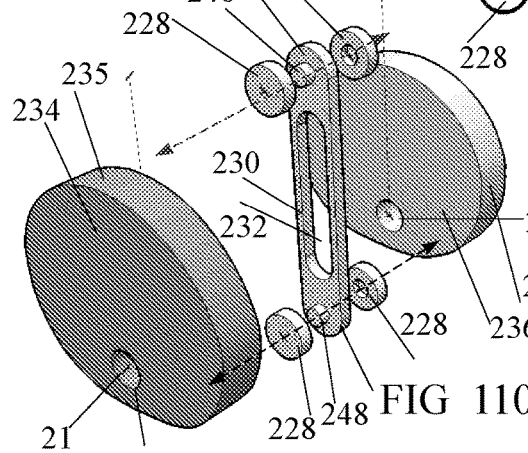

FIGS. 103, 104, 105, 106, 107, 108, 109, and 110 show a two cam, constant diameter cam, C-CAFA. The cam profile is constructed so that the distance between follower rollers, 228, as measured along the axis of reciprocation is constant for any apparatus position. The particular cam profile shown is one with a long dwell near TDC. The rear cam, 236, has an exterior cam surface, 237, while the front cam, 234, has an exterior cam surface, 235. FIGS. 106, 107, 108, 109, 110. The follower type is shown in FIGS. 104, 105, and is comprised of follower rollers, 228, constant diameter cam follower frame, 226, slot, 232, follower rollers, 228, and follower roller pin, 248. Though not shown, and optional piston and rod could be attached to the follower by any conventional means, including having pins facing outward from said follower rollers to which a yoke end of a rod bottom could attach. Shaft, 15, and shaft moorings, 17, are shown in FIG. 103. A shaft hole, 21, is shown in FIG. 110. In this particular embodiment, front cam, 234, is keyed to shaft, 15, for rotation therewith, key not shown. FIG. 103. FIG. 103 also shows direction of shaft rotation and front cam rotation to be the same. Rear cam, 236, rotates freely on shaft, 15, with said shaft going through said rear cam's shaft hole, 21. Shaft, 15, is shown as continuous along its complete length. Suitable bearings, not shown, and suitable bosses, not shown, may optionally be installed along the length of the shaft at appropriate places to reduce friction or prevent cams from moving laterally along the shaft, respectively. The two cams are shown rotating in opposite directions. FIGS. 103, 106, 107, 108, 109 with apparatus counterrotating cam positions of top dead center (TDC), 90 degrees, 180 degrees, and 270 degrees from TDC, respectively shown.

In the first scenario of FIG. 103 we stipulate that the cam follower rollers, 228, ride on the cam outer surfaces, 235, 237, without CAFSI clearances between them. This scenario would include a so called "interference fit". In such case, the structural condition that said cam follower is always structurally in simultaneous and direct contact with at least one and the same particular cam surface of each cam would exist. The second scenario of FIG. 103 is one wherein we stipulate that the cam follower rollers, 228, are loosely fitted to the cam outer surfaces, 235, 237, meaning that finite CAFSI clearances there exist. Thus, the structural condition that at least one sufficiently small yet finite cam and follower surface interface clearance between said cam follower and at least one cam surface of at least one cam would be met, provided that said apparatus is capable of synchronously timing cam counterrotation by and through at least one cam follower and at least one cam surface per cam, acting in combination. Put differently, if such finite CAFSI clearances structurally exist, and the last said functional condition is also met, then such CAFSI clearances are necessarily "sufficiently small" as claimed in the above referenced structural condition. In both of the alternative structural scenarios just described in the referenced embodiment, the structural condition that one and only one of the cams is rotably connected to a rotable output drive shaft is met. In either alternative structural condition scenario just described (i.e., tight or loose fitting followers at the CAFSI), the functional limitation that said apparatus is capable of synchronously timing cam counterrotation by and through at least one cam follower and at least one cam surface per cam, acting in combination, must be also met. In the cam follower scenario fitted without CAFSI clearances, the engineer should endeavor to not make the fit so tight as to impede successful attainment of such just mentioned functional condition. In the loose fitting cam follower scenario, the engineer should endeavor to not create such a degree of looseness which might cause misalignment of the follower and or cause mis-synchronized timing of the counterrotating cams themselves. The particular care just noted that the engineer should endeavor to achieve in terms of sizing the follower vis a vis the apparatuses' counterrotating cams is to be exercised in all scenarios described herein wherein either of the just mentioned alternative structural conditions are sought to be achieved. In certain scenarios, testing of the apparatus may be useful to so determine the optimum working fit between said follower and cam surfaces at the CAFSI. The foregoing discussion applies to the making and using of all of the C-CAFA embodiments disclosed herein wherein it is sought to impose one or the other of the just discussed structural conditions, with the their common functional condition.

FIGS. 45, 46, 47, 49, 50, 51, 52, and 53, show a two cam, ring cam, C-CAFA. The particular cam profile shown is circular. In this case, each cam consists of two parts, an inner and outer. The rear cam has its inner section, 154, and its outer section, 156. The front cam has its inner section, 152, and its outer section, 155. FIGS. 46, 47, show the slotted cylindrical follower, 149, slotted at 161 as shown, said slot to accommodate follower raceway, 157. Slotted rollers, 153, also to accommodate follower raceway, 157. Optional piston, 5, and rod, 3, shown at FIG. 46. Shaft, 15, shaft moorings, 17, and shaft mooring interface, 13, are shown in FIG. 45. A shaft hole, 21, is shown in FIG. 53. In this particular embodiment, front cam inner section, 152, is keyed to shaft, 15, for rotation therewith, key not shown. FIG. 45. FIG. 45 also shows direction of shaft rotation and front cam rotation to be the same. Rear cam inner section, 154, rotates freely on shaft, 15, with said shaft going through said rear cam's shaft hole, 21. Shaft, 15, is shown as continuous along its complete length. Suitable bearings, not shown, and suitable bosses, not shown, may optionally be installed along the length of the shaft at appropriate places to reduce friction or prevent cams from moving laterally along the shaft, respectively. The front and rear inner cam sections are shown rotating in opposite directions. FIG. 45. Apparatus counterrotating cam positions of top dead center (TDC), 90 degrees, 180 degrees, and 270 degrees from TDC, respectively, are shown in FIGS. 49, 50, 51, and 52. Note that the inner and outer sections of each cam will rotate in opposite directions. Slotted rollers and or slotted cylindrical followers and or cam surfaces as above may be bossed if desired to prevent side movement when mounted.

In the first scenario of FIG. 45 we stipulate that the slotted cylindrical follower, 149, and slotted rollers, 153, are all sized and fitted in their follower raceway such that there exists no CAFSI clearances between the cam surfaces and said follower and rollers. This scenario would include a so called "interference fit". In the just described case, the structural condition that the cam follower is always structurally in simultaneous and direct contact with at least one and the same particular cam surface of each cam would exist.

The second scenario of FIG. 45 is one wherein we stipulate that finite CAFSI clearances exist between said rollers and follower and cam surfaces. In such case, the structural condition that at least one sufficiently small yet finite cam and follower surface interface clearance between a cam follower and at least one cam surface of at least one cam would be met, provided that said apparatus is capable of synchronously timing cam counterrotation by and through at least one cam follower and at least one cam surface per cam, acting in combination. Put differently, if such finite CAFSI clearances structurally exist, and the last said functional condition is also met, then such CAFSI clearances are necessarily "sufficiently small" as claimed in the above referenced structural condition. In both of the alternative structural scenarios just described in the referenced embodiment, the structural condition that one and only one of the cams is rotably connected to a rotable output drive shaft is met.

In either alternative structural condition scenario just described (i.e., tight or loose fitting followers at the CAFSI), the functional limitation that said apparatus is capable of synchronously timing cam counterrotation by and through at least one cam follower and at least one cam surface per cam, acting in combination, must be also met.

FIGS. 54, 55, 56, 57, 58, 59, and 60, show a two cam, eccentric strap, C-CAFA. The particular cam profile shown is circular. In this case, front cam 165, and rear cam, 164, are both located within their respective straps, front strap 163, and rear strap 162. The follower in this embodiment is comprised of both straps, 162, 163, plus the strap pivot axle, 167. Said axle may be optionally fitted with bearings. Shaft, 15, shaft moorings, 17, and shaft mooring interface, 13, are shown in FIG. 54. A shaft hole, 21, is shown in FIG. 60. In this particular embodiment, front cam, 165, is keyed to shaft, 15, for rotation therewith, key not shown. FIG. 54. FIG. 54 also shows direction of shaft rotation and front cam rotation to be the same. Rear cam, 164, rotates freely on shaft, 15, with said shaft going through said rear cam's shaft hole, 21. Shaft, 15, is shown as continuous along its complete length. FIG. 54. Suitable bearings, not shown, and suitable bosses, not shown, may optionally be installed along the length of the shaft at appropriate places to reduce friction or prevent cams from moving laterally along the shaft, respectively. The front and rear cams are shown rotating in opposite directions. FIG. 54. Apparatus counterrotating cam positions of top dead center (TDC), 90 degrees, 180 degrees, and 270 degrees from TDC, respectively, are shown in FIGS. 56, 57, 58, and 59. The straps and or cam surfaces and or the strap pivot axle may be bossed if desired to prevent side movement when mounted. MDOF surfaces or bearings may be utilized if desired at the interface between a strap and cam.

In the first scenario of FIG. 54 we stipulate that the straps are fitted onto the cams without CAFSI clearances. This scenario would include a so called "interference fit". In the just described case, the structural condition that the cam follower is always structurally in simultaneous and direct contact with at least one and the same particular cam surface of each cam would exist. This scenario could still fail to accomplish its (next discussed) synchronization function if the strap pivot axle is not tightly fitted into axle hole 169, even though said axle hole and axle do not constitute a CAFSI. Bearings may be used where desired.

The second scenario of FIG. 54 is one wherein we stipulate that finite CAFSI clearances exist between said straps and cams. In such case, the structural condition that at least one sufficiently small yet finite cam and follower surface interface clearance between a cam follower and at least one cam surface of at least one cam would be met, provided that said apparatus is capable of synchronously timing cam counterrotation by and through at least one cam follower and at least one cam surface per cam, acting in combination. Put differently, if such finite CAFSI clearances structurally exist, and the last said functional condition is also met, then such CAFSI clearances are necessarily "sufficiently small" as claimed in the above referenced structural condition. In both of the alternative structural scenarios just described in the referenced embodiment, the structural condition that one and only one of the cams is rotably connected to a rotable output drive shaft is met.

In either alternative structural condition scenario just described (i.e., tight or loose fitting followers at the CAFSI), the functional limitation that said apparatus is capable of synchronously timing cam counterrotation by and through at least one cam follower and at least one cam surface per cam, acting in combination, must be also met.

Other features of, and combinations relating to, the just described embodiments which are not shown:

Any of the described embodiments combined with a machine having at least one piston.

Any of the described embodiments combined with connecting rod, piston, cylinder, and engine.

Any of the described embodiments combined with an MDOF cam, whereby at least one of said cam's surfaces is rotable relative to said cam body.

Any of the described embodiments in which the axes of the counterrotating cams are offset from each other in the lateral direction, said direction being perpendicular to the axis of reciprocation of the follower.

Any of the described embodiments wherein at least one shaft upon which the C-CAFA is mounted is adjustable in the direction of follower reciprocation, said adjustment to be accomplished by a slot on each shaft mooring, said slot long direction for adjustment oriented in the direction of follower reciprocation, a threaded structural element, and a locking nut.

Any of the described embodiments wherein a plurality of said apparatuses are rotably connected to each other via at least one torsionally resistant structural element.

Any of the described embodiments structurally positioned to rotably cooperate with a rotating unbalanced mass such that the motion of at least one reciprocating follower mass of the said embodiment opposes, in whole or in part, the reciprocating mass of said unbalanced apparatus in a way which reduces or eliminates vibrations caused by said reciprocating mass of said unbalanced apparatus.

Any of the described embodiments wherein the cam axis of rotation for each cam is adjustable in the direction of follower reciprocation, said adjustment to be accomplished by a slot on each cam, said slot long direction for adjustment oriented in the direction of follower reciprocation when said cams are at a top or bottom dead center position, a threaded structural element, a locking nut, and threads integral with said cams.

Any of the described embodiments wherein a magnetic force is employed to cause said at least one cam follower to cooperate with said at least one surface of at least one of said cams.

Any electromagnetic C-CAFA embodiment having at least one cam position sensor, at least one receiver for receiving signals from said at least one cam position sensor, at least one regulator for regulating the amount of electromagnetic force between the magnetized cam and the coil.

Any electromagnetic C-CAFA embodiment having at least one electrical input output receptacle for the purpose of supplying electrical power to, or removing electrical power from, said apparatus.

I claim:

1. A counterrotating cam and follower apparatus, comprising:
   two and only two cams;
   a first cam of said cams structurally moored for rotation in at least one rotational direction;
   a second cam of said cams structurally moored for rotation in at least a rotational direction opposite to the above said first cam's at least one rotational direction;
   said first cam comprising at least one cam surface;
   said second cam comprising at least one cam surface;
   at least one cam follower;
   at least one of said at least one cam followers always structurally in simultaneous and direct contact with at least one and the same particular cam surface of each of said cams;
   one and only one of said cams rotably connected to at least one rotable output drive shaft;
   said apparatus to not possess any gear with a stationary axis of rotation, which gear is a structural connection between, and is a separate structural element from, said cams;
   whereby said apparatus is capable of synchronously timing cam counterrotation by and through at least one cam follower and at least one cam surface per cam, acting in combination.

2. The apparatus of claim 1, employed in combination with a machine having at least one reciprocating piston, whereby said combination apparatus converts the reciprocating piston motion of said machine into rotational motion.

3. The apparatus of claim 1, in combination with:
   at least one connecting rod connected to said at least one follower;
   at least one piston connected to said at least one connecting rod;
   at least one cylinder within which said at least one piston fits;
   an internal combustion engine comprised of at least one of said at least one cylinders.

4. The apparatus of claim 1, in which one or more its cams possessing a cam body and at least one cam surface has at least one of said cam surfaces rotable relative to said cam body.

5. The apparatus of claim 1, wherein:
   the axes of said counterrotating cams are offset from each other in the lateral direction, said direction being perpendicular to the axis of reciprocation of the follower of claim 1.

6. The apparatus of claim 1, wherein:
   the at least one shaft upon which the C-CAFA is mounted is adjustable in the direction of follower reciprocation, said adjustment to be accomplished by:
   a slot on each shaft mooring;
   said slot long direction for adjustment oriented in the direction of follower reciprocation
   a threaded structural element, and
   a locking nut.

7. The apparatus of claim 1, in combination with at least one other apparatus of claim 1, wherein:
   the above said plurality of apparatuses are then rotably connected to each other via at least one torsionally resistant structural element.

8. The apparatus of claim 1, wherein:
   the cam axis of rotation for each cam is adjustable in the direction of follower reciprocation, said adjustment to be accomplished by:
   a slot on each cam;
   said slot long direction for adjustment oriented in the direction of follower reciprocation when said cams are at a top or bottom dead center position;
   a threaded structural element,
   a locking nut, and
   threads integral with said cams.

9. A counterrotating cam and follower apparatus, comprising:
   two and only two cams;
   a first cam of said cams structurally moored for rotation in at least one rotational direction;
   a second cam of said cams structurally moored for rotation in at least a rotational direction opposite to the above said first cam's at least one rotational direction;
   said first cam comprising at least one cam surface;
   said second cam comprising at least one cam surface;
   at least one cam follower, structurally positioned to cooperate with at least one of said at least one cam surfaces of each of said cams;
   one and only one of said cams rotably connected to at least one rotable output drive shaft;
   at least one sufficiently small yet finite cam and follower surface interface clearance between each of said at least one cam followers and at least one of said at least one cam surfaces of at least one of said cams;
   said apparatus to not possess any gear with a stationary axis of rotation, which gear is a structural connection between, and is a separate structural element from, said cams;
   whereby said apparatus is capable of synchronously timing cam counterrotation by and through at least one cam follower and at least one cam surface per cam, acting in combination.

10. The apparatus of claim 9, employed in combination with a machine having at least one reciprocating piston, whereby said combination apparatus converts the reciprocating piston motion of said machine into rotational motion.

11. The apparatus of claim 9, in combination with:
    at least one connecting rod connected to said at least one follower;
    at least one piston connected to said at least one connecting rod;
    at least one cylinder within which said at least one piston fits;
    an internal combustion engine comprised of at least one of said at least one cylinders.

12. The apparatus of claim 9, in which one or more its cams possessing a cam body and at least one cam surface has at least one of said cam surfaces rotable relative to said cam body.

13. The apparatus of claim 9, wherein:
    the axes of said counterrotating cams are offset from each other in the lateral direction, said direction being perpendicular to the axis of reciprocation of the follower of claim 9.

14. The apparatus of claim 9, wherein:
    the at least one shaft upon which the C-CAFA is mounted is adjustable in the direction of follower reciprocation, said adjustment to be accomplished by:
    a slot on each shaft mooring;
    said slot long direction for adjustment oriented in the direction of follower reciprocation
    a threaded structural element, and
    a locking nut.

15. The apparatus of claim 9, in combination with at least one other apparatus of claim 9, wherein:

the above said plurality of apparatuses are then rotably connected to each other via at least one torsionally resistant structural element.

16. The apparatus of claim 9 wherein:
the cam axis of rotation for each cam is adjustable in the direction of follower reciprocation, said adjustment to be accomplished by:
a slot on each cam;
said slot long direction for adjustment oriented in the direction of follower reciprocation when said cams are at a top or bottom dead center position;
a threaded structural element,
a locking nut, and
threads integral with said cams.

17. A counterrotating cam and follower apparatus, comprising:
two and only two cams;
a first cam of said cams structurally moored for rotation in at least one rotational direction;
a second cam of said cams structurally moored for rotation in at least a rotational direction opposite to the above said first cam's at least one rotational direction;
said first cam comprising at least one cam surface;
said second cam comprising at least one cam surface;
at least one cam follower;
at least one of said at least one cam followers rotably connected with at least one of said at least one cam surfaces of a first cam and with at least one of said at least one cam surfaces of a second, counterrotating, cam;
one and only one of said cams rotably connected to at least one rotable output drive shaft;
said apparatus to not possess any gear with a stationary axis of rotation, which gear is a structural connection between, and is a separate structural element from, said cams;
whereby said apparatus is capable of synchronously timing cam counterrotation by and through at least one cam follower and at least one cam surface per cam, acting in combination.

18. The apparatus of claim 17, employed in combination with a machine having at least one reciprocating piston, whereby said combination apparatus converts the reciprocating piston motion of said machine into rotational motion.

19. The apparatus of claim 17, in combination with:
at least one connecting rod connected to said at least one follower;
at least one piston connected to said at least one connecting rod;
at least one cylinder within which said at least one piston fits;
an internal combustion engine comprised of at least one of said at least one cylinders.

20. The apparatus of claim 17, in which one or more its cams possessing a cam body and at least one cam surface has at least one of said cam surfaces rotable relative to said cam body.

21. The apparatus of claim 17, wherein:
the axes of said counterrotating cams are offset from each other in the lateral direction, said direction being perpendicular to the axis of reciprocation of the follower of claim 17.

22. The apparatus of claim 17, wherein:
the at least one shaft upon which the C-CAFA is mounted is adjustable in the direction of follower reciprocation, said adjustment to be accomplished by:
a slot on each shaft mooring;
said slot long direction for adjustment oriented in the direction of follower reciprocation
a threaded structural element, and
a locking nut.

23. The apparatus of claim 17, in combination with at least one other apparatus of claim 17, wherein:
the above said plurality of apparatuses are then rotably connected to each other via at least one torsionally resistant structural element.

24. The apparatus of claim 17, wherein:
the cam axis of rotation for each cam is adjustable in the direction of follower reciprocation, said adjustment to be accomplished by:
a slot on each cam;
said slot long direction for adjustment oriented in the direction of follower reciprocation when said cams are at a top or bottom dead center position;
a threaded structural element,
a locking nut, and
threads integral with said cams.

* * * * *